(12) United States Patent
Saito et al.

(10) Patent No.: US 7,076,626 B2
(45) Date of Patent: Jul. 11, 2006

(54) DATA TRANSFER CONTROL DEVICE, ELECTRONIC INSTRUMENT, AND DATA TRANSFER CONTROL METHOD

(75) Inventors: Nobuyuki Saito, Sapporo (JP); Yoshimi Oka, Kitahiroshima (JP)

(73) Assignee: Seiko Epson Corporation, Tokyo (JP)

( * ) Notice: Subject to any disclaimer, the term of this patent is extended or adjusted under 35 U.S.C. 154(b) by 339 days.

(21) Appl. No.: 10/379,709

(22) Filed: Mar. 6, 2003

(65) Prior Publication Data

US 2003/0188112 A1    Oct. 2, 2003

(30) Foreign Application Priority Data

Mar. 20, 2002  (JP)  .............................. 2002-077973

(51) Int. Cl.
*G06F 13/16* (2006.01)
(52) U.S. Cl. ..................................... 711/165
(58) Field of Classification Search ............... 711/165; 710/53, 306, 310
See application file for complete search history.

(56) References Cited

U.S. PATENT DOCUMENTS

| | | | | |
|---|---|---|---|---|
| 5,687,392 | A | * | 11/1997 | Radko ........................ 710/22 |
| 5,983,301 | A | * | 11/1999 | Baker et al. ................ 710/113 |
| 6,085,225 | A | | 7/2000 | Nakajima et al. |
| 6,158,039 | A | * | 12/2000 | Cho et al. ................... 714/769 |

(Continued)

FOREIGN PATENT DOCUMENTS

| | | |
|---|---|---|
| EP | 0 978 965 | 4/1998 |
| JP | A-08-331197 | 12/1996 |
| JP | A-10-70548 | 3/1998 |
| JP | 10-285223 | 10/1998 |
| JP | WO 98/48543 A1 | 10/1998 |
| JP | 2000-132498 | 5/2000 |
| JP | A 2000-307948 | 11/2000 |
| JP | A 2000-312237 | 11/2000 |
| JP | A 2001-036588 | 2/2001 |
| JP | A-2001-69481 | 3/2001 |
| JP | 2001-119414 | 4/2001 |

(Continued)

OTHER PUBLICATIONS

U.S. Appl. No. 10/379,910, Saito et al., filed Mar. 6, 2003.

(Continued)

*Primary Examiner*—Kevin L. Ellis
(74) *Attorney, Agent, or Firm*—Oliff & Berridge, PLC

(57) ABSTRACT

A data transfer control device includes a DMAC1 that writes a packet transferred from a BUS1 (IEEE 1394 or USB), to a SRAM, a DMAC2 that reads the written isochronous data from the SRAM and writes it to a SDRAM, and a DMAC3 that reads the written isochronous data and transfers it to a BUS2 side. During transmission, isochronous data is read from the SDRAM and written to SRAM, and an isochronous packet including the written isochronous data is transferred to the BUS1 side. The SRAM includes an isochronous data area and an asynchronous data area. The SRAM is provided insides the data transfer control device and the SDRAM is provided on outside the data transfer control device.

20 Claims, 18 Drawing Sheets

U.S. PATENT DOCUMENTS

| | | |
|---|---|---|
| 6,192,428 B1 * | 2/2001 | Abramson et al. ............. 710/52 |
| 6,427,196 B1 * | 7/2002 | Adiletta et al. ............. 711/158 |
| 6,438,604 B1 * | 8/2002 | Kuver et al. ................. 709/234 |
| 6,606,691 B1 * | 8/2003 | Didier et al. ................ 711/151 |
| 6,618,832 B1 | 9/2003 | Schweidler et al. |
| 6,857,028 B1 | 2/2005 | Ishida et al. |
| 2002/0015494 A1 | 2/2002 | Nagai et al. |
| 2004/0019712 A1 * | 1/2004 | Takase ........................ 710/22 |

FOREIGN PATENT DOCUMENTS

JP  A-2001-331106  11/2001

OTHER PUBLICATIONS

U.S. Appl. No. 10/390,862, Saito et al., filed Mar. 19, 2003.
U.S. Appl. No. 10/390,702, Saito et al., filed Mar. 19, 2003.

* cited by examiner

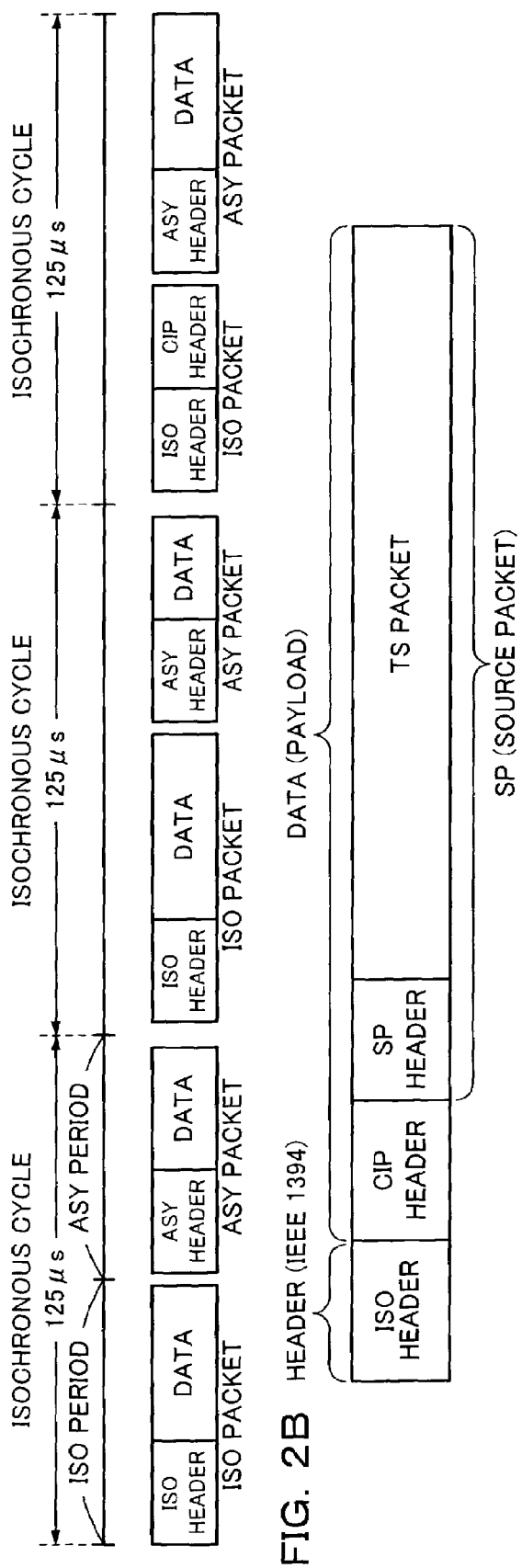

FIG. 5A  RECEPTION
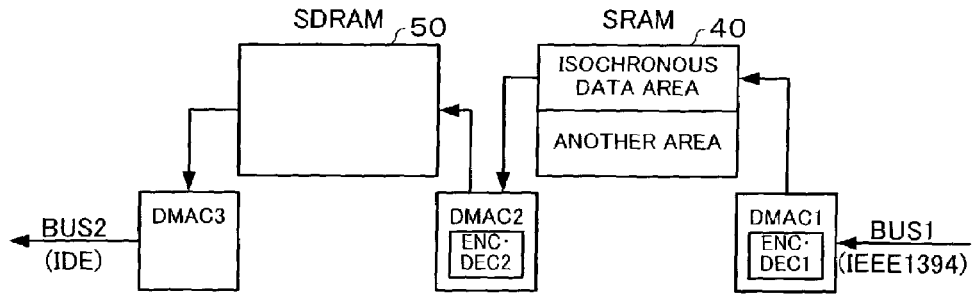
FIG. 5B  RECEPTION
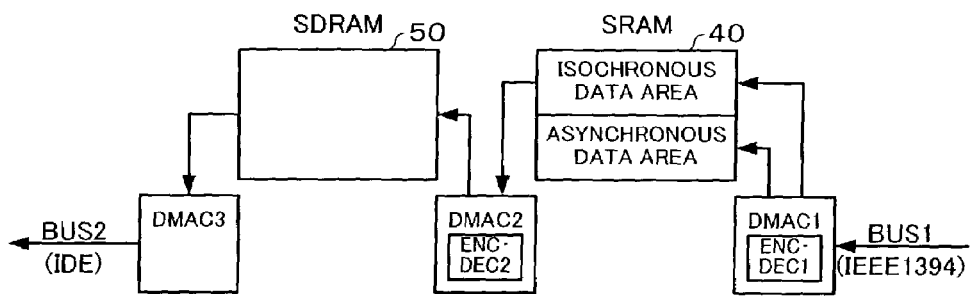
FIG. 5C  RECEPTION
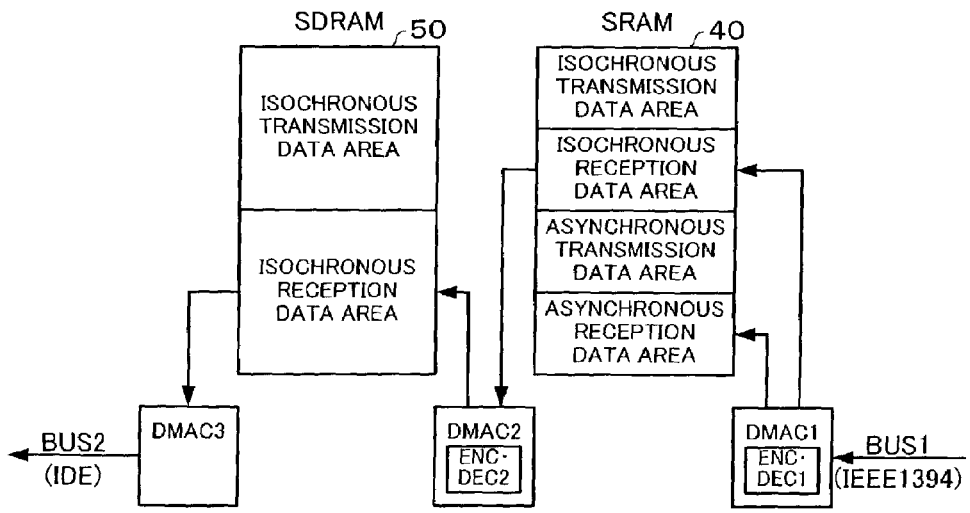

FIG. 6A    TRANSMISSION
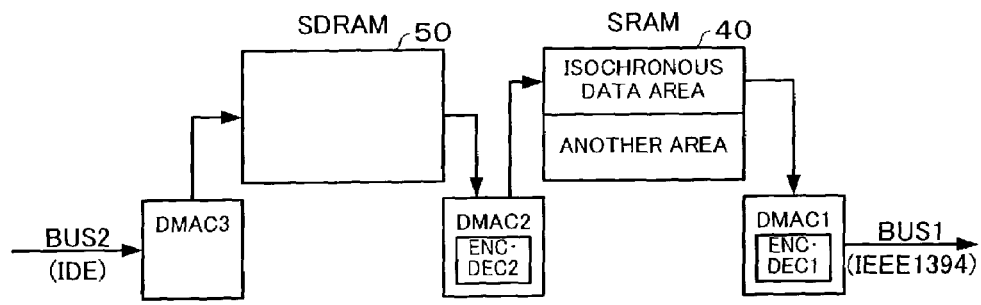
FIG. 6B    TRANSMISSION
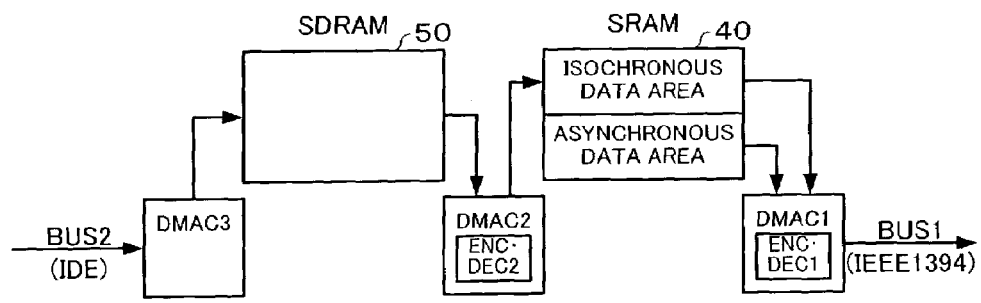
FIG. 6C    TRANSMISSION
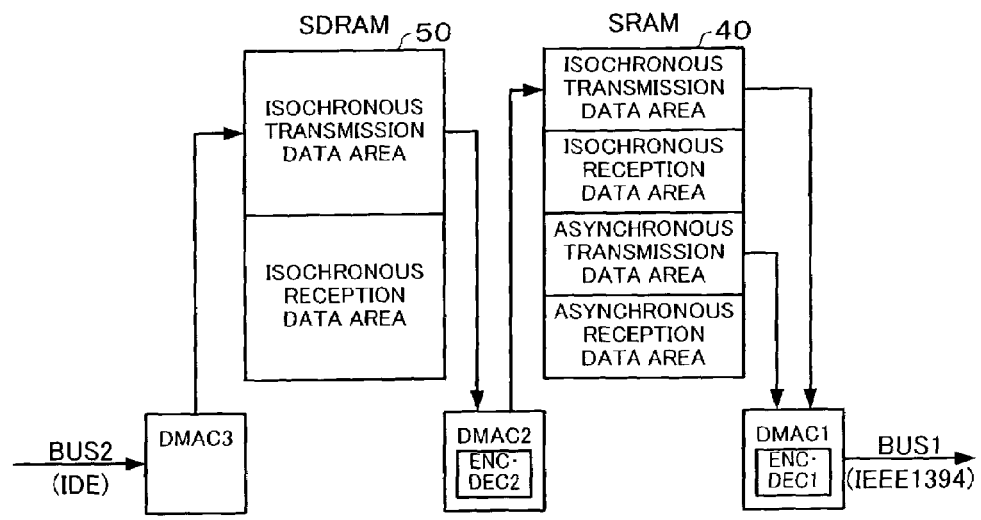

FIG. 9A  RECEPTION
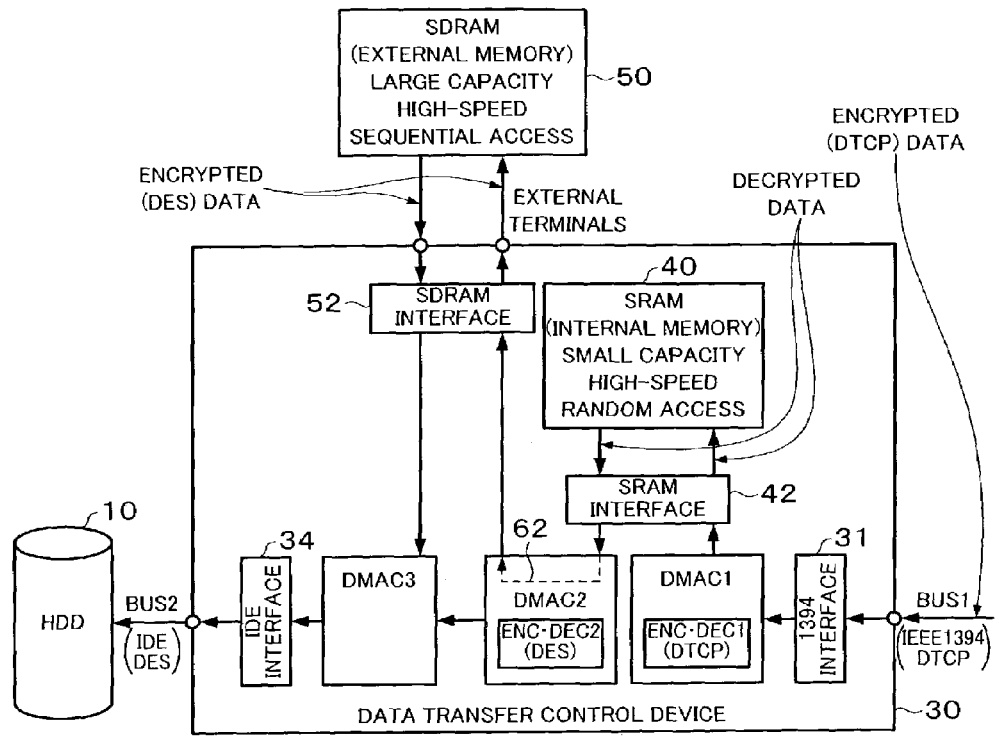
FIG. 9B  TRANSMISSION
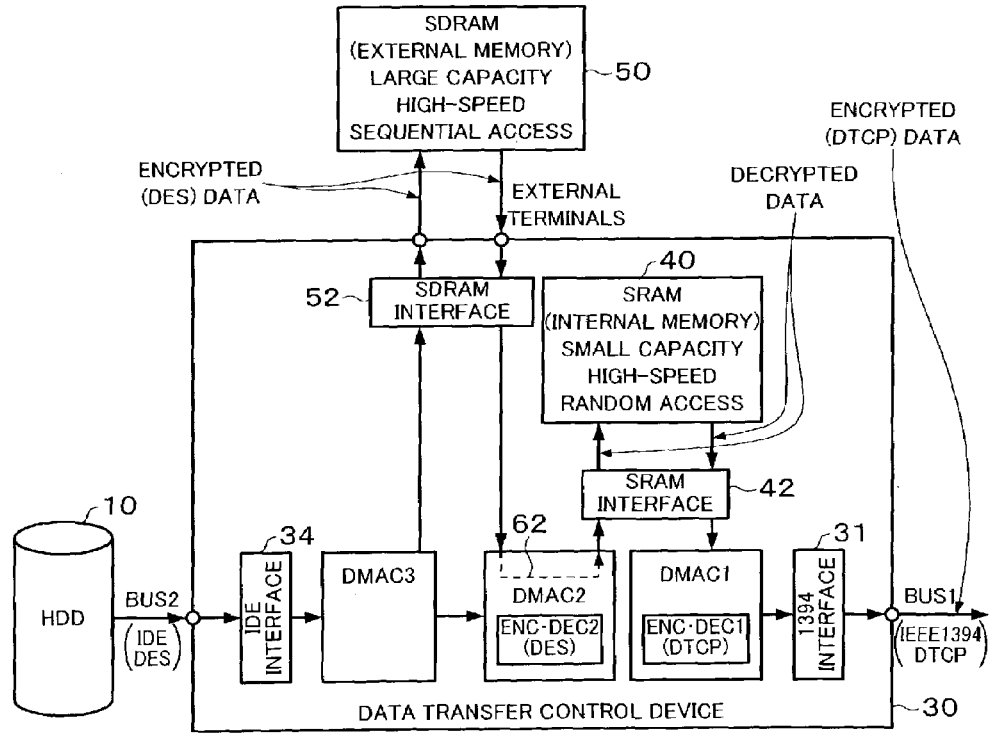

FIG. 10A  RECEPTION
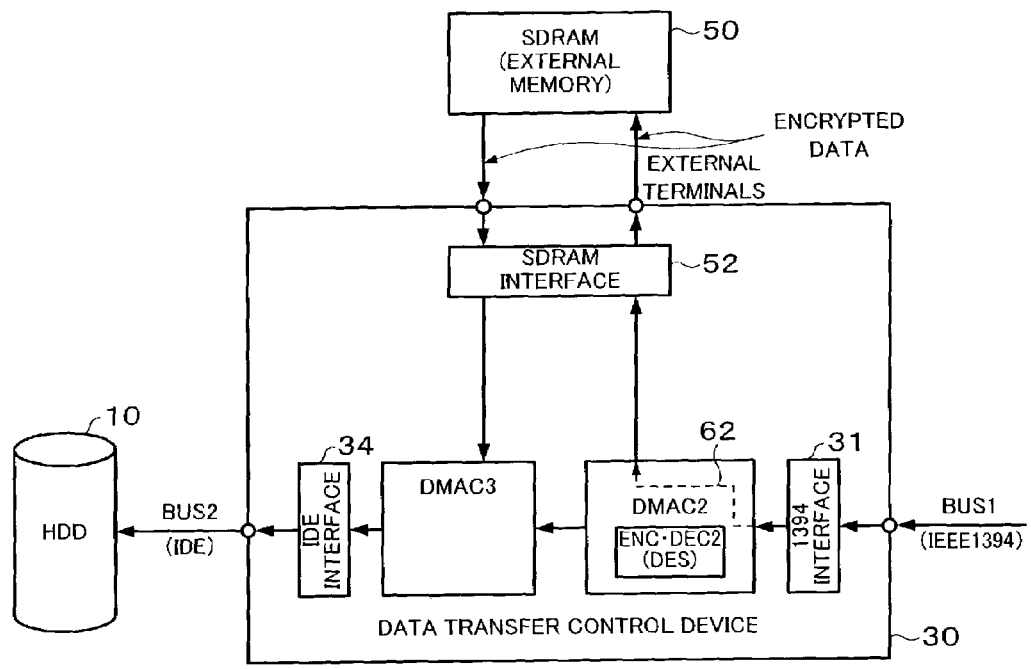
FIG. 10B  TRANSMISSION
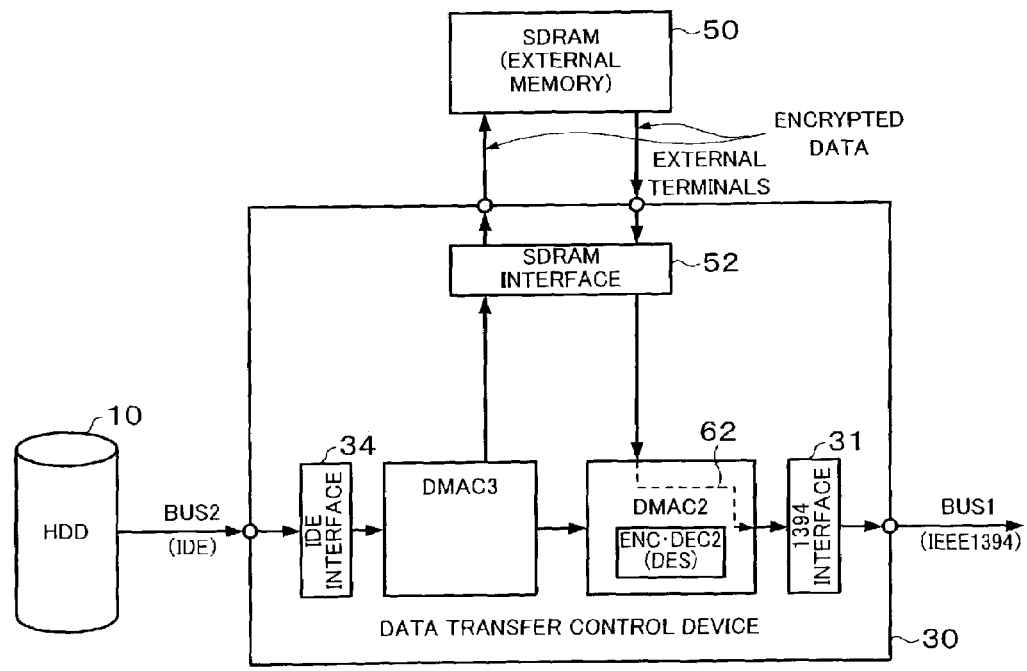

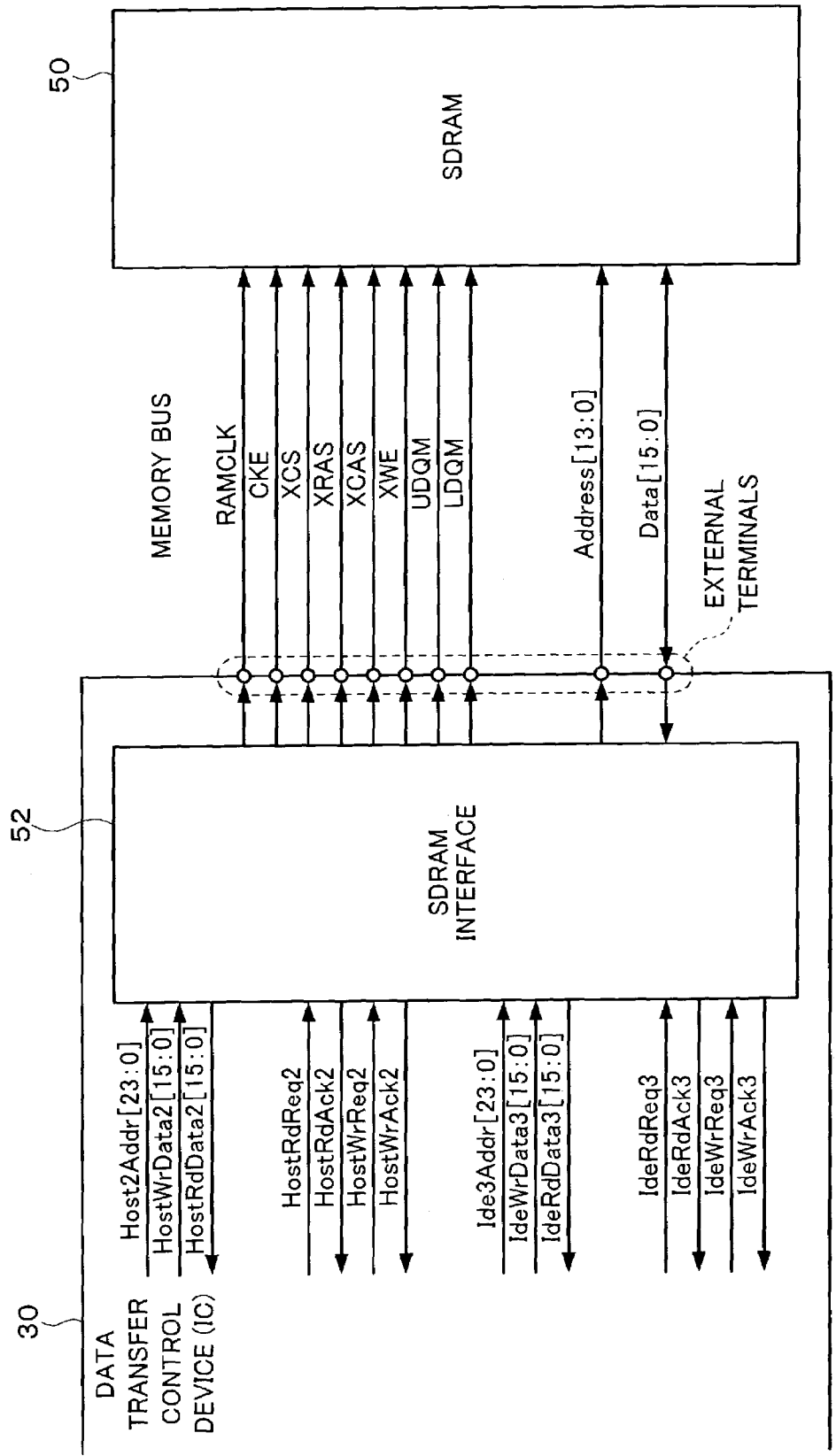

FIG. 13A  BETWEEN SDRAM AND SDRAM INTERFACE

| | | |
|---|---|---|
| | RAMCLK | SYNCHRONIZATION CLOCK FOR SDRAM |
| CONTROL SIGNALS | CKE | SIGNAL INDICATING WHETHER OR NOT CLOCK IS VALID |
| | XRAS | ROW ADDRESS STROBE |
| | XCAS | COLUMN ADDRESS STROBE |
| | XWE | WRITE ENABLE |
| | UDQM | HIGH-ORDER BYTE OUTPUT ENABLE |
| | LDQM | LOW-ORDER BYTE OUTPUT ENABLE |
| | Address[13:0] | ADDRESS (14 BITS) |
| | Data[15:0] | DATA (16 BITS) |

FIG. 13B  BETWEEN DMAC2 AND SDRAM INTERFACE

| | |
|---|---|
| Host2Addr[23:0] | READ/WRITE ADDRESS FROM DMAC2 TO SDRAM |
| HostWrData2[15:0] | WRITE DATA FROM DMAC2 TO SDRAM |
| HostRdData2[15:0] | READ DATA FROM SDRAM TO DMAC2 |
| HostRdReq2 | READ REQUEST FROM DMAC2 TO SDRAM |
| HostRdAck2 | READ ACKNOWLEDGEMENT FROM SDRAM TO DMAC2 |
| HostWrReq2 | WRITE REQUEST FROM DMAC2 TO SDRAM |
| HostWrAck2 | WRITE ACKNOWLEDGEMENT FROM SDRAM TO DMAC2 |

FIG. 13C  BETWEEN DMAC3 AND SDRAM INTERFACE

| | |
|---|---|
| Ide3Addr[23:0] | READ/WRITE ADDRESS FROM DMAC3 TO SDRAM |
| IdeWrData3[15:0] | WRITE DATA FROM DMAC3 TO SDRAM |
| IdeRdData3[15:0] | READ DATA FROM SDRAM TO DMAC3 |
| IdeRdReq3 | READ REQUEST FROM DMAC3 TO SDRAM |
| IdeRdAck3 | READ ACKNOWLEDGEMENT FROM SDRAM TO DMAC3 |
| IdeWrReq3 | WRITE REQUEST FROM DMAC3 TO SDRAM |
| IdeWrAck3 | WRITE ACKNOWLEDGEMENT FROM SDRAM TO DMAC3 |

DATA TRANSFER CONTROL DEVICE, ELECTRONIC INSTRUMENT, AND DATA TRANSFER CONTROL METHOD

Japanese Patent Application No. 2002-77973, filed on Mar. 20, 2002, is hereby incorporated by reference in its entirety.

BACKGROUND OF THE INVENTION

The present invention relates to a data transfer control device, an electronic instrument, and a data transfer control method.

It has recently become popular to distribute digital audio-visual (AV) data by digital broadcasting or over the Internet. Together with the spread of this digital distribution of AV data, there have been increasing demands for digital recording/reproduction devices (electronic instruments) that are capable of recording the thus-distributed data efficiently.

A high-speed serial bus such as one in accordance with IEEE 1394 or the universal serial bus (USB) 2.0 is used for the transfer of AV data. A digital recording/reproduction device (electronic instrument) that records AV data is preferably provided with a storage medium such as a hard disk drive (HDD) that is capable of storing large volumes of data at high speed.

For that reason, the demand is increasing for a data transfer control device that can transfer data at high speed between a high-speed bus in accordance with IEEE 1394 or USB 2.0 and a storage medium such as an HDD.

BRIEF SUMMARY OF THE INVENTION

An aspect of the present invention relates to a data transfer control device for data transfer through a bus, the data transfer control device comprising:

a first memory access control circuit which writes packets transferred from a first bus side, to a first memory;

a second memory access control circuit which reads isochronous data included within an isochronous packet among the packets written to the first memory, and writes the read isochronous data to a second memory; and a third memory access control circuit which reads the isochronous data that has been written to the second memory, and transfers the read isochronous data to a second bus side.

Another aspect of the present invention relates to a data transfer control device for data transfer through a bus, the data transfer control device comprising:

a third memory access control circuit which writes isochronous data transferred from a second bus side, to a second memory;

a second memory access control circuit which reads the isochronous data that has been written to the second memory and writes the read isochronous data to the first memory; and a first memory access control circuit which reads the isochronous data that has been written to the first memory and transfers an isochronous packet including the read isochronous data to a first bus side.

BRIEF DESCRIPTION OF THE SEVERAL VIEWS OF THE DRAWING

FIGS. 2A, 2B, 2C, and 2D are illustrative of isochronous transfer and asynchronous transfer;

FIGS. 5A, 5B, and 5C are illustrative of the data transfer control method of this embodiment;

FIGS. 6A, 6B, and 6C are further illustrative of the data transfer control method of this embodiment

FIGS. 9A and 9B are illustrative of a method that provides SDRAM outside of the data transfer control device;

FIGS. 10A and 10B are also illustrative of a method that provides SDRAM outside of the data transfer control device;

FIG. 12 shows a detailed configurational example of the data transfer control device;

FIGS. 13A, 13B, and 13C show the meanings of the signals used by the data transfer control device;

DETAILED DESCRIPTION OF THE EMBODIMENT

Figure 1A:
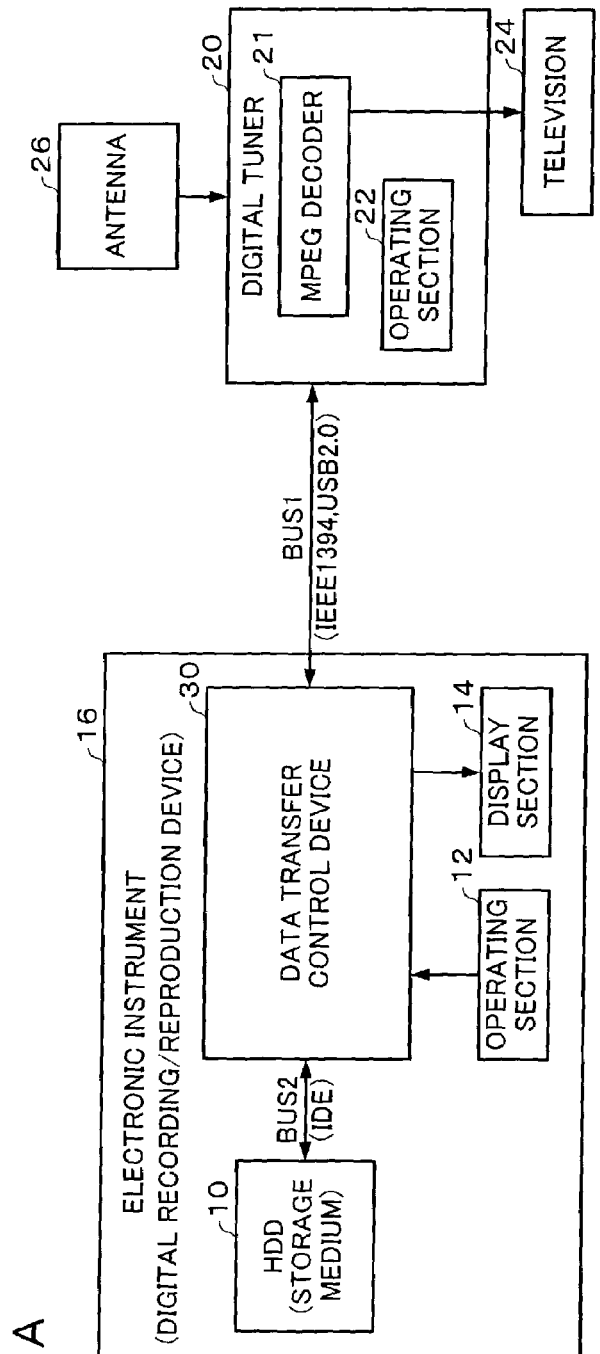
FIGS. 1A and 1B show examples of the configuration of an electronic instrument in accordance with an embodiment of the present invention.

Embodiments of the present invention are described below.

It should be noted that the embodiment described below does not in any way limit the scope of the present invention as laid out in the claims herein. In addition, the entirety of the configuration described with reference to these embodiments is not limited to being essential structural components of the present invention.

An embodiment of the present invention relates to a data transfer control device for data transfer through a bus, the data transfer control device comprising:

a first memory access control circuit which writes packets transferred from a first bus side, to a first memory;

a second memory access control circuit which reads isochronous data included within an isochronous packet among the packets written to the first memory, and writes the read isochronous data to a second memory; and a third memory access control circuit which reads the isochronous data that has been written to the second memory, and transfers the read isochronous data to a second bus side.

With this embodiment, a packet transferred from a first bus side is written to a first memory. Isochronous data is then read selectively from the first memory and is written to a second memory. The written isochronous data is read from the second memory and transferred to the second bus side.

With this data transfer control device, isochronous data is selected from packets transferred from the first bus side and is written to the first memory. The isochronous data is then buffered in the second memory that functions as cache memory, and is transferred to the second bus side. This makes it possible to transfer isochronous data that is required to be transferred at a fixed transfer rate without break, efficiently from the first bus side to the second bus side.

With this data transfer control device, a storage area of the first memory may include an isochronous data area in which isochronous data is stored and another area, the first memory access control circuit may writes isochronous data included within an isochronous packet among packets transferred from the first bus side, to the isochronous data area in the first memory, and the second memory access control circuit may read the isochronous data that has been written to the isochronous data area of the first memory and may write the read isochronous data to the second memory.

This configuration makes it possible for the first memory to function as memory for classifying isochronous data. This simplifies the processing for writing isochronous data in the first memory into the second memory.

With this data transfer control device, a storage area of the first memory may include an isochronous data area in which isochronous data is stored and an asynchronous data area in which asynchronous data is stored, and the first memory access control circuit may write isochronous data included within an isochronous packet among packets transferred from the first bus side, to an isochronous data area in the first memory, and may write asynchronous data included within an asynchronous packet among packets transferred to the first bus side, to the asynchronous data area in the first memory.

This configuration makes it possible for the first memory to function as memory for classifying isochronous data and asynchronous data. This enables a simple method of separating image data and sound data to be transferred as isochronous data and command data and the like to be transferred as asynchronous data.

With this data transfer control device, a storage area of the first memory may include an isochronous reception data area which stores isochronous data transferred from the first bus side and an isochronous transmission data area which stores isochronous data transferred from the second bus side, a storage area of the second memory may include an isochronous reception data area which stores isochronous data transferred from the first bus side and an isochronous transmission data area which stores isochronous data transferred from the second bus side, the first memory access control circuit may write isochronous data that is transferred from the first bus side to the isochronous reception data area of the first memory, and the second memory access control circuit may read isochronous data that has been written to the isochronous reception data area of the first memory and may write the read isochronous data to the isochronous reception data area of the second memory.

This configuration makes it possible to transmit isochronous data independently.

Another embodiment of the present invention relates to a data transfer control device for data transfer through a bus, the data transfer control device comprising:

a third memory access control circuit which writes isochronous data transferred from a second bus side, to a second memory;

a second memory access control circuit which reads the isochronous data that has been written to the second memory and writes the read isochronous data to the first memory; and a first memory access control circuit which reads the isochronous data that has been written to the first memory and transfers an isochronous packet including the read isochronous data to a first bus side.

With this embodiment, isochronous data transferred from a second bus side is written to a second memory. The isochronous that has been read into the second memory is then written to a first memory. An isochronous packet including the written isochronous data is transferred to the first bus side.

With this embodiment configured in this manner, the isochronous data transferred from the second bus side is buffered by the second memory that functions as a cache memory, and is transferred to the first bus side. This makes it possible to transfer isochronous data that is required to be transferred at a fixed transfer rate without break, efficiently from the second bus side to the first bus side.

With this data transfer control device, a storage area of the first memory may include an isochronous data area in which isochronous data is stored and another area, the second memory access control circuit may read the isochronous data that has been written to the second memory and may write the read isochronous data to the isochronous data area of the first memory, and the first memory access control circuit may read the isochronous data that has been written to the isochronous data area of the first memory and may transfer an isochronous packet including the read isochronous data to the first bus side.

This configuration makes it possible for the first memory to function as memory for classifying isochronous data. This simplifies the processing for writing isochronous data in the second memory into the first memory.

With this data transfer control device, a storage area of the first memory may include an isochronous data area in which isochronous data is stored and an asynchronous data area in which asynchronous data is stored, and the first memory access control circuit may read isochronous data that has been written to the isochronous data area of the first memory, may transfer an isochronous packet including the read isochronous data to the first bus side, may read asynchronous data that has been written to an asynchronous data area of the first memory, and may transfer an asynchronous packet including the read asynchronous data to the first bus side.

This configuration makes it possible for the first memory to function as memory for classifying isochronous data and asynchronous data With this data transfer control device, a storage area of the first memory may include an isochronous reception data area which stores isochronous data transferred from the first bus side and an isochronous transmission data area which stores isochronous data transferred from the second bus side, a storage area of the second memory may include an isochronous reception data area which stores isochronous data transferred from the first bus side and an isochronous transmission data area which stores isochronous data transferred from the second bus side, the second memory access control circuit may read isochronous data that has been written to the isochronous transmission data area of the second memory and may write the read isochronous data to the isochronous transmission data area of the first memory, and wthe first memory access control circuit may read isochronous data that has been written to the isochronous transmission data area of the first memory and may transfer an isochronous packet including the read isochronous data to the first bus side.

This configuration makes it possible to transmit isochronous data independently.

With this data transfer control device, the second memory may be a synchronized type of memory that is capable of inputting and outputting data having sequential addresses in synchronization with a clock.

If a synchronized type of memory is used for the second memory, it is possible to efficiently transfer isochronous data that is to be transferred as burst data.

With this data transfer control device, the first memory may be an internal memory provided within the data transfer control device, and the second memory may be an external memory provided outside the data transfer control device.

This configuration makes it possible to design a more compact, less expensive data transfer control device.

A further embodiment of the present invention relates to an electronic instrument including: any one of the above described data transfer control devices; the second bus connected with the data transfer control device; and a storage medium storing data transferred from the data transfer control device through the second bus.

A still further embodiment of the present invention relates to a data transfer control method for data transfer through a bus, the method including:

writing packets transferred from a first bus side, to a first memory;

reading isochronous data included within an isochronous packet among the packets written to the first memory, and writing the read isochronous data to a second memory; and reading the isochronous data that has been written to the second memory, and transferring the read isochronous data to a second bus side.

An even further embodiment of the present invention relates to a data transfer control method for data transfer through a bus, the method including:

writing isochronous data transferred from a second bus side, to a second memory;

reading the isochronous data that has been written to the second memory and writing the read isochronous data to the first memory; and reading the isochronous data that has been written to the first memory and transferring an isochronous packet including the read isochronous data to a first bus side.

The embodiments of the present invention are described in detail below, with reference to the accompanying figures.

1. Electronic Instrument

Figure 1B:
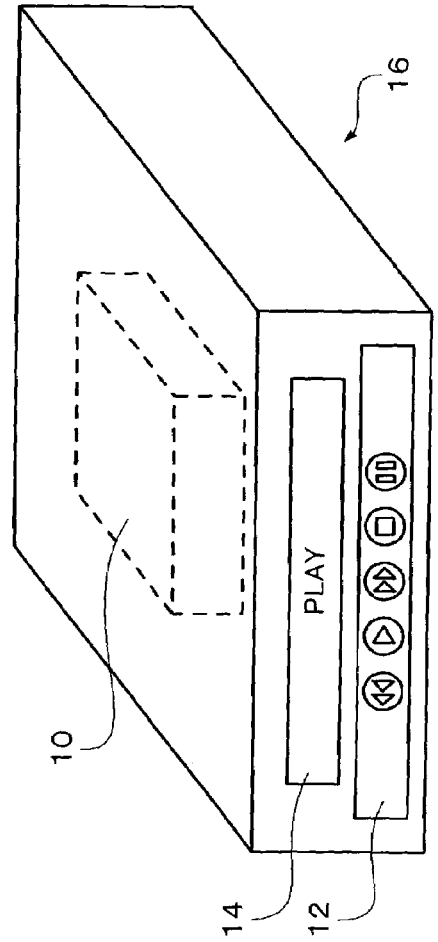

A typical block diagram of an electronic instrument (digital recording/reproduction device) that includes a data transfer control device 30 of this embodiment is shown in FIG. 1A, and a typical external view thereof is shown in FIG. 1B.

This electronic instrument 16 includes a hard disk drive (HDD) 10 and the data transfer control device 30. It also includes an operating section 12 that enables the user to operate the electronic instrument. It further includes a display section 14 (LCD) that displays various items of information to the user.

The user can specify details such as the reproduction mode (normal reproduction or special reproduction), by operating the operating section 12. Details such as the current reproduction mode can be confirmed by viewing information that is displayed on the display section 14.

This electronic instrument 16 is connected to a digital tuner 20 (or digital video camera) by a first bus BUS1 such as an IEEE 1394 bus or a USB 2.0 bus. The digital tuner 20 also includes a moving picture experts group (MPEG) decoder 21 (broadly speaking: a decoder), where this MPEG decoder 21 decrypts an MPEG stream that has been received by components such as an antenna 26. A television 24 (display section) displays images and outputs sounds, based on the decrypted data. The user uses an operating section 22 (such as a remote control) to perform operations such as select a channel (broadcast station) or specify a reproduction mode (normal reproduction or special reproduction).

During the recording of an MPEG stream to the HDD 10 (broadly speaking: a storage medium) for audio-visual (AV) use, the MPEG stream (TS packets) that has been received by the antenna 26 is written to the HDD 10 via the BUS1 (IEEE 1394 or USB 2.0) and the data transfer control device 30.

During the reproduction of an MPEG stream from the HDD 10, on the other hand, the MPEG stream (TS packets or isochronous data) is read from the HDD 10 through a second bus BUS2 such as an integrated device electronics (IDE) bus. The thus-read MPEG stream is transferred to the digital tuner 20 through the BUS1 and is decrypted by the MPEG decoder 21 of the digital tuner 20. This causes the display of images on the television 24.

Note that the electronic instrument to which the present invention is applied is not limited to the electronic instrument shown in FIGS. 1A and 1B. The present invention could also be applied to various other electronic instruments such as a video tape recorder (with internal HDD), an optical disk (DVD) recorder, a digital video camera, a personal computer, or a portable type of information terminal.

2. Isochronous Transfer

The packet transfer methods provided by IEEE 1394 are asynchronous transfer (ideal for data transfer where reliability is required) and isochronous transfer (ideal for the transfer of data such as moving images and sounds, real-time capabilities are required). Asynchronous transfer is a transfer method that does not guarantee the transfer rate of the data but does guarantee the reliability of the data. Isochronous transfer, on the other hand, is a transfer method that does not guarantee the reliability of the data but does guarantee the immediacy of the transfer. This isochronous transfer is supported by the universal serial bus (USB) standard.

The bus states during data transfer under IEEE 1394 are shown schematically in FIG. 2A.

An isochronous transfer starts with the cycle master generating a cycle-start packet every fixed period. This enables the transfer of at least one isochronous (ISO) packet every 125 μs (every isochronous transfer cycle), per channel. As a result, it is possible to transfer requested data such as moving images and sounds, in a real-time manner.

Asynchronous transfer occurs in the intervals between isochronous transfers. In other words, with IEEE 1394, isochronous transfer has a higher priority than asynchronous transfer, and the remaining periods after isochronous transfer has ended are utilized for the transfer of asynchronous (ASY) packets.

An example of the format of an isochronous transfer packet during the transfer of an MPEG stream over an IEEE 1394 bus is shown in FIG. 2B.

In FIG. 2B, the ISO header corresponds to the header of a packet in IEEE 1394 format and the common isochronous packet (CIP) header, source packet (SP) header, and transport stream (TS) header correspond to the data (payload) of a packet in IEEE 1394 format.

Examples of the formats of these SP and CIP headers are shown in FIGS. 2C and 2D. These SP and CIP headers are defined by the IEC 61883 standard that laid down the protocol for the transfer of an MPEG stream over an IEEE 1394 bus. The SP header includes data such as time stamp information (number of cycles for the isochronous transfer and an offset within the isochronous transfer cycles). The CIP header declares that the data to be transferred is MPEG data, it specifies the division method of the MPEG TS packets, and it also includes data such as source node ID, data block size, and format ID.

Note that the SP header is not necessary if the electronic instrument connected to the IEEE 1394 bus is a digital video camera or the like, instead of a digital tuner. In such a case, time stamp information is included within the CIP header.

3. Configuration of Data Transfer Control Device

Figure 3:
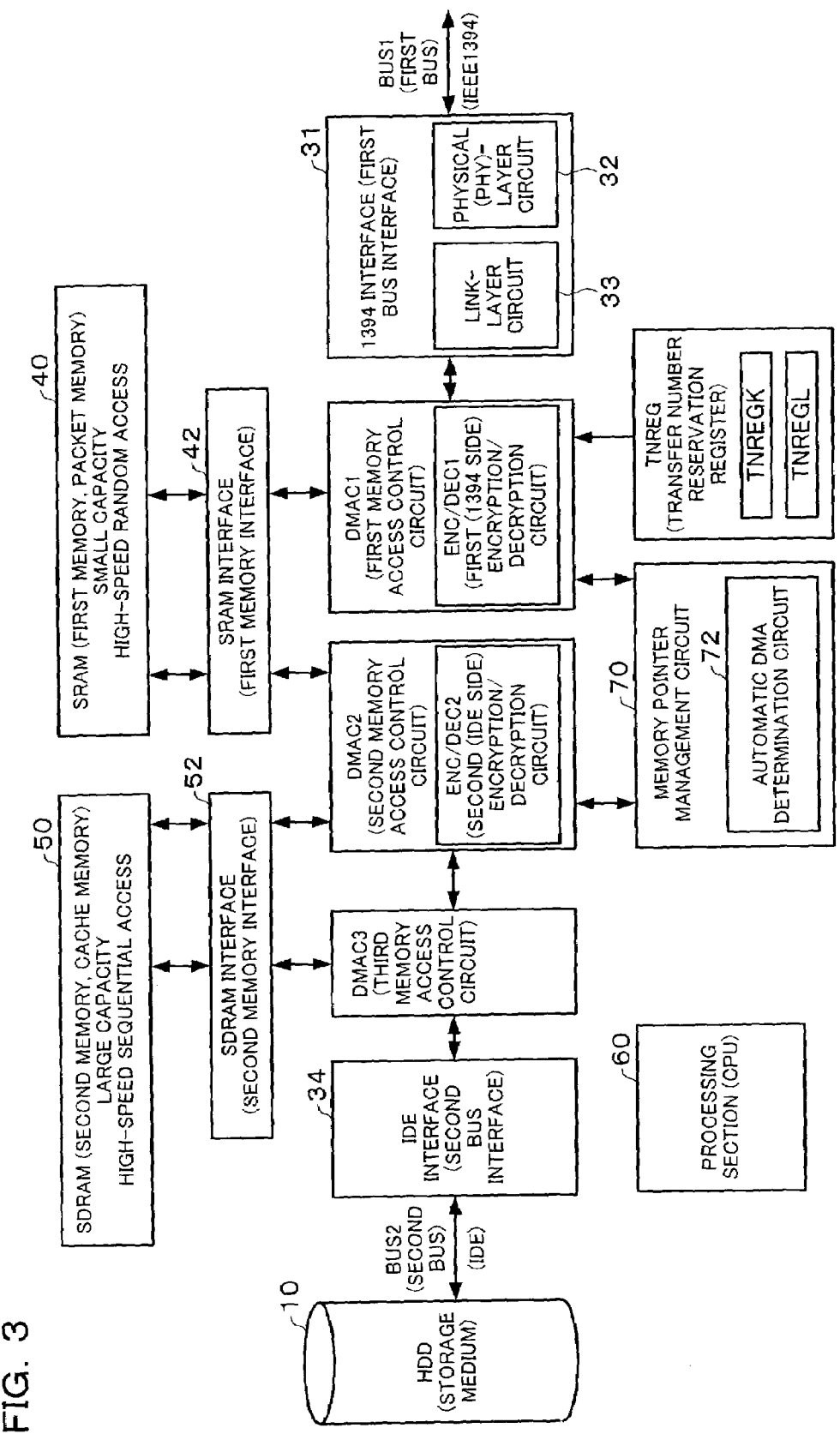
FIG. 3 shows an example of the configuration of the data transfer control device of this embodiment.

An example of the configuration of the data transfer control device of this embodiment (denoted by 30 in FIG. 1) is shown in FIG. 3. Note that the data transfer control device of this embodiment does not necessarily include all of the circuits and units (components) shown in FIG. 3; it is also possible to have a configuration in which some of them are omitted.

The data transfer control device of FIG. 3 includes a 1394 interface 31 (broadly speaking: a first bus interface). This 1394 interface 31 implements an interface between the data transfer control device and other electronic instruments (such as a digital tuner) connected to an IEEE 1394 bus (the first bus BUS1). It also includes a physical layer (PHY) circuit 32 and link layer circuit 33 that implement a physical layer and a link layer under the IEEE 1394 protocol.

The data transfer control device included an IDE interface 34 (broadly speaking: a second bus interface or an interface for storage media). The IDE interface 34 is circuitry that implements an interface between the data transfer control device and the hard disk drive HDD 10 (broadly speaking: a storage medium).

If the HDD 10 is for AV use, an inexpensive HDD having an IDE (ATA) interface, which is widely used for personal computers, is used therefor. For an electronic instrument such as a digital tuner (BS tuner or CS tuner), on the other hand, IEEE 1394 is widely used as the interface for digital data (digital video data or digital audio data).

If the 1394 interface 31 and the IDE interface 34 are provided, as shown in FIG. 3, a conversion bridge function between IEEE 1394 (broadly speaking: a first bus standard) and IDE (broadly speaking: a second bus standard) could be implemented in the data transfer control device.

The data transfer control device includes an SRAM interface 42 that implements an interface with static random access memory (SRAM) 40. It also includes an SDRAM interface 52 that implements an interface with synchronous dynamic random access memory (SDRAM) 50.

In this case, the SRAM 40 (broadly speaking: a first memory, packet memory or packet buffer) is smaller in capacity than the SDRAM 50 (second memory). Random access memory can be operated at high speeds.

This SRAM 40 has the function of temporarily storing packets (ISO packets or TS packets) that have been received through the first bus BUS1 (IEEE 1394 or the like). The HDD 10 storage medium has the function of temporarily storing packets that have been read from the second bus BUS2, for transfer over BUS1.

The SRAM 40 is memory that can be accessed at random by components such as a first direct memory access controller (DMAC1), a DMAC2, and a processing section 60 (such as a CPU, MPU, or system controller). In this case, the SRAM interface 42 functions as a mediation circuit. In other words, the SRAM interface 42 mediates accesses from the DMAC1 (accesses from the BUS1 side), accesses from the processing section 60, and accesses from the DMAC2 (accesses from the BUS2 side). A data path is established between the SRAM 40 and one of the DMAC1, the DMAC2, and the processing section 60, based on the mediation result.

Note that the SRAM 40 is preferably provided within the data transfer control device but it could also be provided outside of the data transfer control device.

The storage area of the SRAM 40 could be divided into a header area (control information area) and a data area, or into a transmission area and a reception area. It could also be divided into an asynchronous area and an isochronous area.

The SDRAM 50 (broadly speaking: a second memory, cache memory or synchronized type of memory), on the other hand, has a larger capacity than the SRAM 40. It is a memory that can be accessed sequentially (in which access to sequential addresses can be done) at a higher speed than random access (or the SRAM 40). It is also a memory that enables the input and output of data (burst data) with sequential addresses, in synchronization with a clock. This SDRAM 50 functions as a cache memory for isochronous data.

Note that the SDRAM 50 is preferably provided outside of the data transfer control device but it could also be provided within the data transfer control device. Instead of ordinary SDRAM, other high-speed synchronized types of memory such as DDR SDRAM or RDRAM made by the Rambus company could be used therefor.

The storage area of the SDRAM 50 could be divided into a transmission area and a reception area, or into an asynchronous area and an isochronous area.

The data transfer control device includes the DMAC1 (broadly speaking: a first memory access control circuit). This DMAC1 performs processing for writing packets (data and headers) from the first bus BUS1 side (the 1394 interface 31) to the SRAM 40. It also performs processing for reading data (isochronous data) that has been written to the SRAM 40 and transferring packets (isochronous packets) assembled from this data and headers to the BUS1 side.

More specifically, the DMAC1 generates write request and write addresses during a write to the SRAM 40. Similarly, it generates read requests and read addresses during a read from the SRAM 40. This implements DMA transfer between the SRAM 40 and the 1394 interface 31 (BUS1), without involving the processing section 60.

The data transfer control device includes the DMAC2 (broadly speaking: a second memory access control circuit). This DMAC2 performs processing to read isochronous data that has been written to the SRAM 40 and write the thus-read data to the SDRAM 50 that has a larger capacity than the SDRAM 50. It also performs processing to read isochronous data that has been written to the SDRAM 50 and write the thus-read isochronous data to the SRAM 40.

More specifically, the DMAC2 generates read requests and read addresses during a read from-the SRAM 40 or the SDRAM 50. Similarly, it generates write requests and write addresses during a write to the SRAM 40 or the SDRAM 50.

This implements DMA transfer between the SRAM 40 and the SDRAM 50, without involving the processing section 60.

The data transfer control device includes a DMAC3 (broadly speaking: a third memory access control circuit). This DMAC3 performs processing for reading isochronous data that has been written to the SDRAM 50 and transferring the thus-read isochronous data to the BUS2 side (the IDE interface 34). It also performs processing for writing the isochronous data that has been transferred from the BUS2 side to the SDRAM 50.

More specifically, the DMAC3 generates read requests and read addresses during a read from the SDRAM 50. Similarly, it generates write requests and write addresses during a write to the SDRAM 50. This implements DMA transfer between the SDRAM 50 and the BUS2 (the IDE interface 34), without involving the processing section 60.

The DMAC1 includes a first encryption/decryption circuit ENC/DEC1 (on the 1394 side). This ENC/DEC1 performs processing for encrypting data (isochronous data) that has been read from the SRAM 40 in accordance with a first encryption process, for transfer to the BUS1 side. It also performs processing for decrypting encrypted data (encrypted isochronous data) that has been transferred from the BUS1 side in accordance with a first decryption process, for writing to the SRAM 40.

In such a case, processing such as that in accordance with Digital Transmission Content Protection (DTCP), which is an encryption standard under IEEE 1394, could be utilized as the first encryption process (decryption process).

In this case, DTCP (5C DTCP) is a standard for the transmission of encrypted data between electronic instruments (devices) connected by IEEE 1394. Before encrypted data that ought to be protected is transmitted between electronic instruments, this DTCP enables certification to verify whether or not the electronic instrument on the reception side is provided with a data protection mechanism. If it is verified by the certification processing that a protection mechanism is provided, a key for unlocking the encryption is exchanged between the electronic instruments. The electronic instrument on the transmission side transmits the encrypted data and the electronic instrument on the reception side decrypts the thus-received encrypted data.

This configuration makes it possible to transmit protected data between electronic instruments conforming to DTCP. This enables protection of data contents from an electronic instrument that does not have a protection mechanism or an electronic instrument that attempts to modify the data.

This DTCP also provides for the exchange between electronic instruments of copy control information that has been set by a contents provider. This enables copy controls such as "copy prohibited", "single copy enabled", and "freely copyable", revision information (system renewability messages) can be distributed together with the contents. This makes it possible to prohibit and suppress data transfer to illegal electronic instruments and inhibit illegal copying in the future. In addition, this DTCP is expected to be utilized not only with IEEE 1394, but also as the USB encryption standard.

Note that the DTCP encryption and decryption processes are described in detail on the homepage of the Digital Transmission Licensing Administrator (DTLA).

The DMAC2 includes a second (IDE side) encryption/decryption circuit ENC/DEC2. This ENC/DEC2 performs processing to encrypt data (isochronous data, or data transferred from the BUS1 side) that has been read from the SRAM 40 in accordance with a second encryption process, for writing to the SDRAM 50. It also performs processing to decrypt encrypted data (encrypted isochronous data) in accordance with a second decryption process, for transfer to the SRAM 40 (processing for transfer to the BUS1 side).

In such a case, processing such as that in accordance with the Data Encryption Standard (DES), which is a common-key encryption method, could be utilized as the second encryption process (decryption process).

Common-key encryption methods are encryption methods that are widely used in fields such as the financial world. These common-key encryption methods use the same key for encryption and decryption. Among the common-key encryption methods, DES is the most widely used.

This DES uses 16-stage iterations of non-linear conversion (sbox) and permutation processing for blocks of 64 bits of data. A 48-bit sub-key is used in the processing at each stage, where these sub-keys are created from a 64-bit common key.

Within DES are single DES (SDES) and triple DES (TDES). TDES is an encryption method that repeats the SDES algorithm three times. This TDES enables the use of the SDES algorithm and, since it achieves an effect similar to increasing the length of the encryption key, it enables an increase in the strength of the encryption in a comparatively simple manner.

Note that the data transfer control device of this embodiment can also be applied to the Advanced Encryption Standard (AES), which is a common-key encryption method that supersedes DES, in addition to DES (single DES or triple DES).

The data transfer control device includes the processing section 60. This processing section 60 controls the various circuits and units (components) within the device and also provides overall control of the device. The functions of the processing section 60 could be implemented by hardware such as a CPU or system controller (ASIC) or by firmware (a program). Note that processing section 60 could be provided outside of the data transfer control device.

The data transfer control device includes a memory pointer management circuit 70. This memory pointer management circuit 70 is a circuit for managing read and write pointers (pointers indicating addresses in memory) of the SRAM 40 (or the SDRAM 50). The DMAC1 and DMAC2 use the pointers managed (controlled) by the memory pointer management circuit 70 to generate memory addresses and implement DMA transfers.

An automatic DMA determination circuit 72 (broadly speaking: a automatic memory access determination circuit) included by the memory pointer management circuit 70 is a circuit that determines whether or not the amount of received data in the SRAM 40 has exceeded a given transfer unit (transfer data quantity. If the quantity of reception data has exceeded a given transfer unit (for example, N bytes), this automatic DMA determination circuit 72 makes an automatic DMA (memory access) start signal go active. This ensures that the DMAC2 reads the above described transfer unit of data (isochronous data) from the reception data area of the SRAM 40, and transfers it to the SDRAM 50 (BUS2) side. The ENC/DEC2 encrypts the data in the above described transfer units.

The data transfer control device includes a transfer number reservation register TNREG. This transfer number reservation register TNREG is a register that the processing section 60 uses for reserving the number of transfers for an isochronous packet (broadly speaking: a packet) including isochronous data.

In other words, the DMAC1 reads isochronous packet (isochronous data and isochronous header) from the SRAM 40. It then performs processing for transferring the thus-read isochronous packet automatically at each isochronous transfer cycle (125 μs) to the BUS1 side (transfer without involving the processing section 60), until the number of transfers reserved in TNREG reaches zero.

Note that if the number of transfers reserved in TNREG reaches zero, the automatic transfer is suspended at the next isochronous transfer cycle and an interrupt is generated with respect to the processing section 60.

The TNREG includes a transfer number reservation register TNREGK for the page area of the K-th (where K=0, by way of example) header area of the SRAM 40 and a transfer number reservation register TNREGL for the page area of the L-th (where L=1, by way of example) header area.

When the processing section 60 is preparing the isochronous header to be written to the K-th page area, the DMAC1 reads the isochronous header written to the L-th page area and the isochronous data written to the data area, from the SRAM 40. Isochronous packets configured of the thus-read isochronous header and isochronous data are then transferred automatically to the BUS1 side, until the reserved number of transfers in TNREGL reaches zero.

When the processing section 60 is preparing the isochronous header to be written to the L-th page area, the DMAC1 reads the isochronous that is written to the K-th page area and the isochronous that is written to the data area, from the SRAM 40. Isochronous packets configured of the thus-read isochronous header and isochronous data are then transferred automatically to the BUS1 side, until the reserved number of transfers in TNREGK reaches zero.

Figure 4:
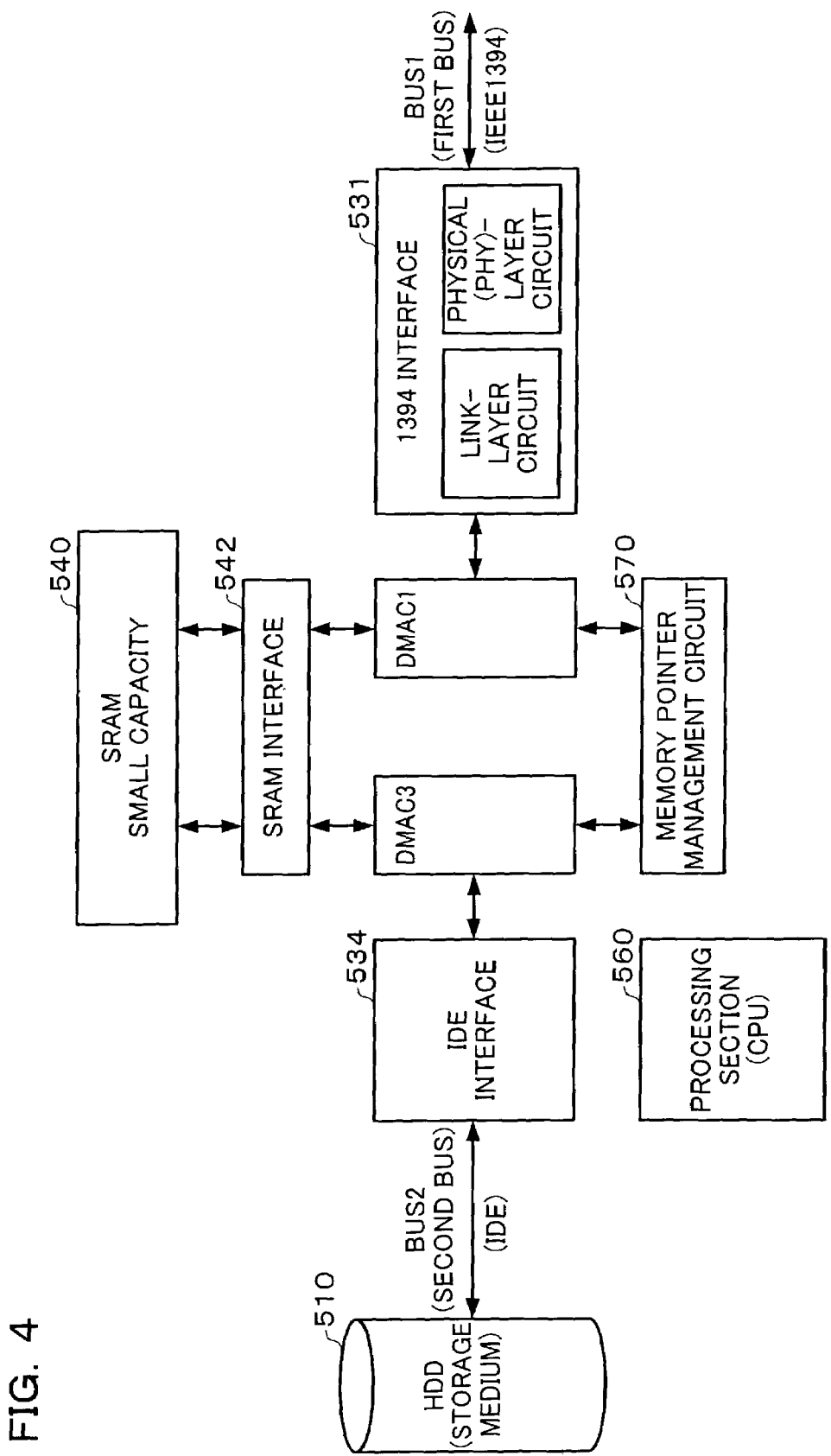
FIG. 4 shows an example of the configuration of the data transfer control device of a comparative example.

A data transfer control device in accordance with a comparative example is shown in FIG. 4.

The main difference between FIGS. 3 and 4 is the lack of components such as the DMAC2 that implements DMA transfer between SRAM and SDRAM, the SDRAM interface 52, the transfer number reservation register TNREG, and the automatic DMA determination circuit 72.

The configuration of the comparative example of FIG. 4 is suitable for the transfer of file data of a personal computer. For high-speed transfer of AV data, however, the configuration of this embodiment shown in FIG. 3 is more appropriate.

In other words, IEEE 1394 enables the transfer of AV data by an isochronous method. In such a case, the isochronous transfer transfers isochronous packets without breaks, at a fixed transfer rate or higher. With the reading or writing of data with respect to an HDD 510, on the other hand, it is necessary to have an access time (head seek time) of a fixed length. Thus, with a configuration in which only a small-capacity SRAM 540 is provided, as in FIG. 4, it is not possible to provide slack-absorbing buffering of isochronous packets to be transferred without breaks. In other words, if there is any delay in the processing of writing to the HDD 510, due to the head seek time, it will not be possible to receive isochronous packets. If there is any delay in reading from the HDD 510, it will be impossible to transmit isochronous packets.

In contrast thereto, the configuration of this embodiment shown in FIG. 3 uses the SDRAM 50 that functions as a cache memory, to buffer the isochronous data. This therefore enables slack-absorbing buffering of the isochronous data to be transferred without breaks, even if there is some delay in the write processing or read processing with respect to the HDD 510, making it possible to guarantee data continuity. In other words, it is possible to increase the reproduction capabilities of AV data, by using the inexpensive SDRAM 50, which can be obtained easily, to cache the isochronous data, thus guaranteeing the data transfer rate.

In particular, a fixed quantity of data is transferred sequentially by isochronous transfer. In other words, a certain quantity of continuous image data or sound data is transferred as a batch. With FIG. 3, therefore, the use of the SDRAM 50 that can perform rapid sequential access (access to sequential addresses) as cache memory for isochronous data makes it possible to implement efficient buffering of the isochronous data.

The SRAM 40 performs processing to classify the data. The processing section 60 randomly accesses desired addresses of the SRAM 40 and performs packet processing to write the header of the packet to be transferred and analyze the packet. Use of the SRAM 40, which can perform random accesses faster than the SDRAM 50, as memory for classification processing and packet processing makes it possible to implement efficient classification processing and packet processing.

In this embodiment as shown in FIG. 3, the SRAM 40 is used as memory for data classification processing and packet processing and the SDRAM 50 is used as cache memory for isochronous data, enabling memory usage that has not been possible up to now. This enables the implementation of efficient data transfer processing that is not possible with the configuration of FIG. 4.

4. Data Transfer Control Method

The data transfer control method of this embodiment will now be described with reference to FIGS. 5A, 5B, 6A, and 6B.

In the embodiment shown in FIG. 5A, the storage area of the SRAM (first memory) is separated into an area for storing isochronous data and another area.

During reception, as shown in FIG. 5A, the DMAC1 selects an isochronous packet from the packets transferred to the BUS1 side, and writes the isochronous data included within the isochronous packet to the isochronous data area of the SRAM 40. During this time, the first encryption/decryption circuit ENC/DEC1 decrypts the encrypted data in accordance with DTCP or the like. It then writes the decrypted data to the isochronous data area of the SRAM 40.

Next, the DMAC2 reads the isochronous data from the isochronous data area of the SRAM 40 and writes it to the SDRAM 50 (the second memory). During this time, the second encryption/decryption circuit ENC/DEC2 encrypts the isochronous data that has been read from the SRAM 40, in accordance with DES or the like. It then writes the encrypted data to the SDRAM 50.

The performance of this encryption process makes it possible to maintain the confidentiality of the isochronous data (digital contents) that has been written to the SDRAM 50 in this manner, thus enabling the implementation of copyright protection.

The DMAC3 then reads the encrypted isochronous data from the SDRAM 50 and transfers it to the BUS2 side. The configuration is such that the isochronous data (TS packets) encrypted by DES in this manner are stored on the HDD 10.

Note that the storage area of the SRAM 40 is preferably divided into an isochronous data area and an asynchronous data area, as shown in FIG. 5B.

In such a case, the DMAC1 selects a packet to be transferred from the BUS1 side, writes the isochronous data to the isochronous data area, and writes the asynchronous data to the asynchronous data area. The DMAC2 reads only the isochronous data that has been written to the isochronous data area, and writes it to the SDRAM 50.

The storage area of the SRAM 40 could also be divided into an isochronous transmission data area, and isochronous reception data area, an asynchronous transmission data area, and an asynchronous reception data area, as shown in FIG. 5C. Similarly, the storage area of the SDRAM 50 could be divided into an isochronous transmission data area and an isochronous reception data area.

In such a case, the DMAC1 writes isochronous data to the isochronous data area and asynchronous data to the asynchronous data area. The DMAC2 then reads the isochronous data from the SRAM 40 and writes it to the isochronous reception data area of the SDRAM 50. The DMAC3 reads the isochronous data from the isochronous reception data area of the SDRAM 50 and transfers it to the BUS2 side.

During transmission, as shown in FIG. 6A, the DMAC3 writes isochronous data (TS packets) from the BUS2 side (the HDD 10) to the SDRAM 50.

The DMAC2 then reads the isochronous data from the SDRAM 50 and writes it to the isochronous data area of the SRAM 40. During this time, the second encryption/decryption circuit ENC/DEC2 decrypts the encrypted data by DES. It then writes the decrypted data to the isochronous data area of the SRAM 40.

The DMAC1 then reads the isochronous data from the isochronous data area of the SRAM 40 and transfers it to the BUS1 side. During this time, the first encryption/decryption circuit ENC/DEC1 encrypts the isochronous data read from the SRAM 40 in accordance with DTCP or the like. It then transfers the encrypted data over BUS1.

The performance of this DTCP encryption process makes it possible to maintain the confidentiality of the isochronous data (digital contents) by IEEE 1394, thus enabling the implementation of copyright protection.

Note that if the storage area of the SRAM 40 is divided into an isochronous data area and an asynchronous data area, the data transfer could be done as shown in FIG. 6B. If the storage areas of the SRAM 40 and the SDRAM 50 are divided into a transmission data area and a reception data area, the data transfer could be done as shown in FIG. 6C.

If the isochronous data area and asynchronous data area are not separated for the transfer of AV data, it would be difficult to classify the AV data (AV stream) and AV commands (AV/C protocol commands).

Since the storage area of the SRAM 40 of this embodiment is divided into an isochronous data area and an asynchronous data area, as shown in FIGS. 5B and 6B, it is simple to classify AV data and AV commands. This makes it possible to transfer only the AV data that has been received from the BUS1 (IEEE 1394) side automatically to the BUS2 (IDE) side, enabling the implementation of efficient AV data transfer that does not place any load on the processing section 60.

With this embodiment, the storage areas of the SRAM 40 and the SDRAM 50 are divided into a transmission data area and a reception data area, as shown in FIGS. 5C and 6C. This makes it possible to transmit and receive isochronous data independently. It is therefore possible to simultaneously guarantee the transfer rates for the transmission and reception of isochronous data. As a result, it is simple to implement time-shifted reproduction in which image data is read from the HDD 10 while other image data is being stored on the HDD 10.

Figure 7:
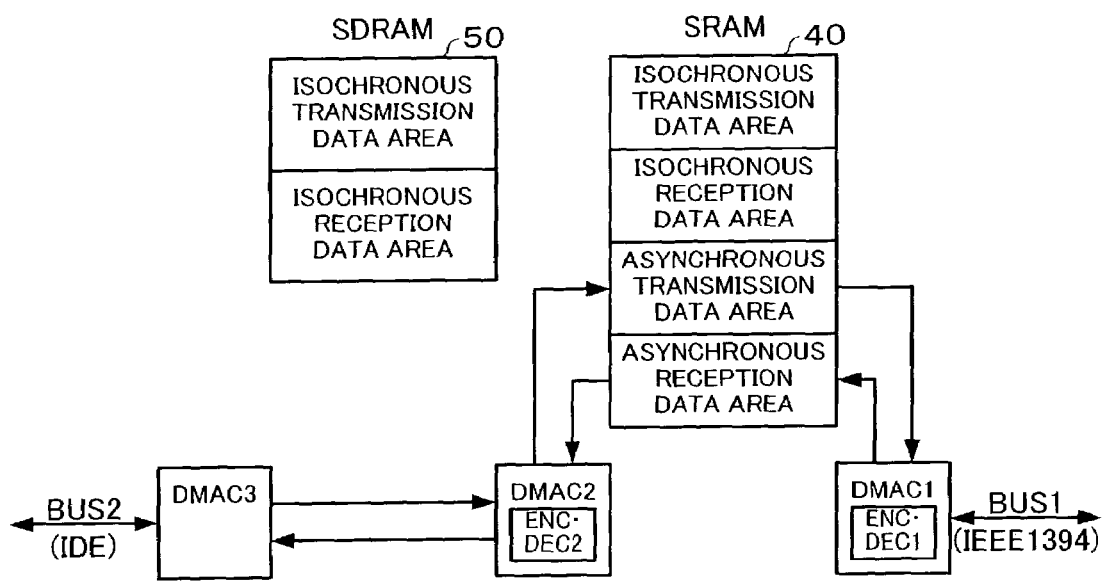
FIG. 7 is illustrative of the data transfer control method for the transfer of asynchronous data.

Note that if asynchronous data is stored on the HDD 10, the data transfer could be as shown in FIG. 7. In other words, the data transfer path of the SDRAM 50 is bypassed so that asynchronous data is transferred directly between the DMAC2 and DMAC3.

In such a case, the isochronous data can accumulate unchanged in the SDRAM 50, waiting until the transfer of asynchronous data has ended. When the transfer of asynchronous data ends, the data transfer control device is reconnected to the SDRAM 50 on the outside. The isochronous data collected in the SDRAM 50 is transferred by the method described with reference to FIGS. 5A to 6C, and the transfer could be restarted.

In general, asynchronous transfer is used when the HDD 10 is to be used as a personal computer (PC) file system. If AV data is to be stored in the HDD 10, on the other hand, isochronous transfer is used.

As shown by this embodiment, the storage area of the SRAM 40 is divided into an isochronous data area and an asynchronous data area, and also the SDRAM 50 separates from the DMA transfer path during asynchronous transfer, so that both AV data and PC file data can be stored on the HDD 10. In other words, when AV data that is isochronous data is being transferred, the data transfer could be done through the isochronous data area using the method shown in FIGS. 5A to 6C. When PC file data that is asynchronous data is being transferred, on the other hand, the SDRAM 50 could separate from the DMA transfer path to transfer data through the asynchronous data area.

In this manner the user can be provided with a usage state in which it seems that both an HDD for AV data and an HDD for PC use are connected.

Figure 8A:
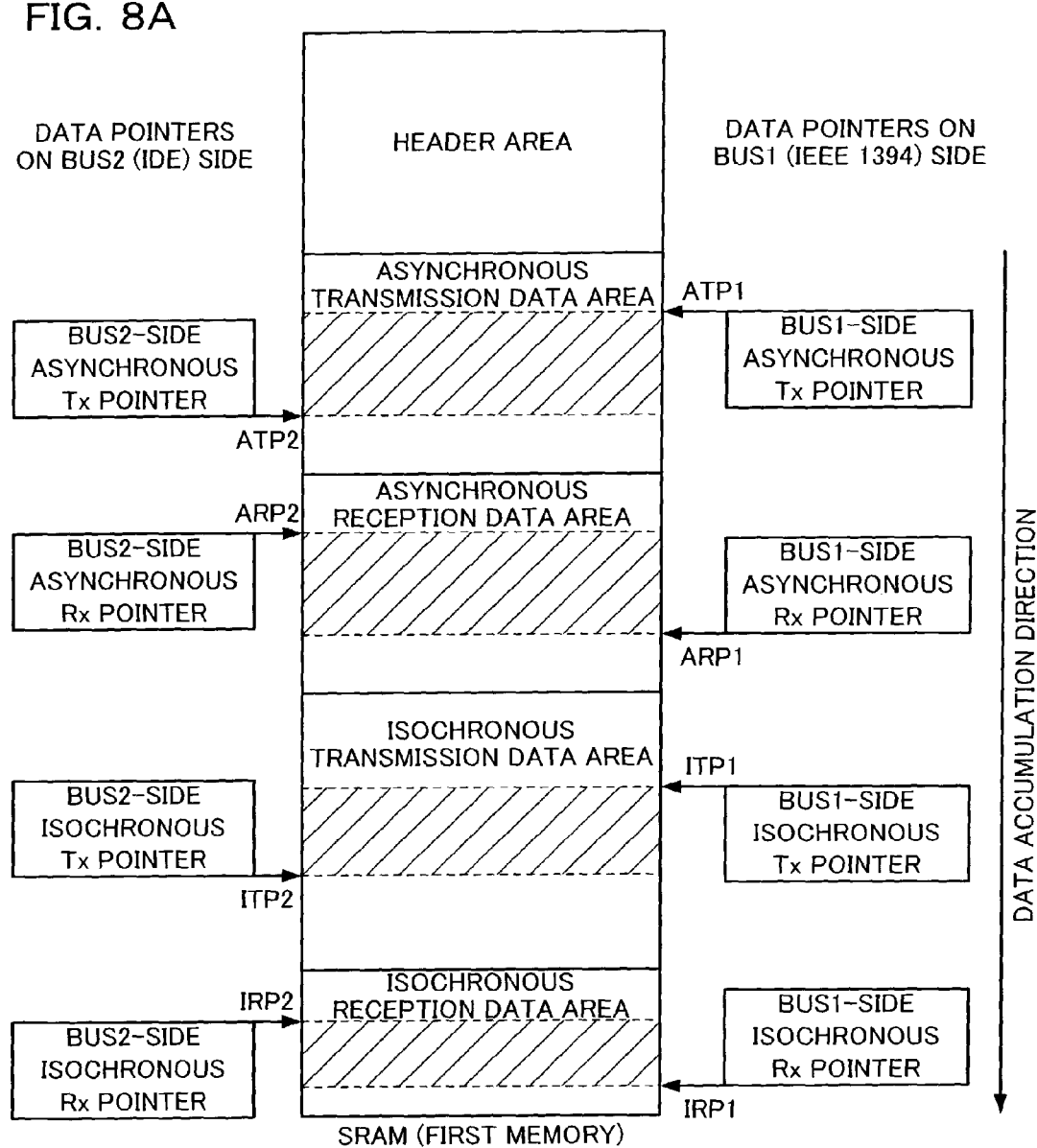
FIGS. 8A and 8B show examples of the memory maps of the SRAM and SDRAM.
Figure 8B:
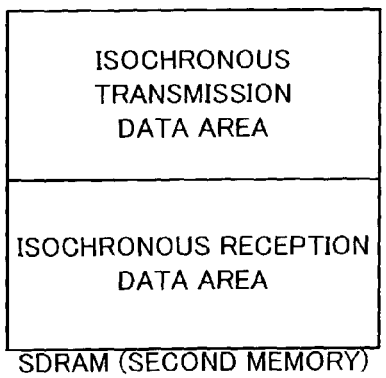

Detailed examples of the memory maps of the SRAM 40 and the SDRAM 50 as shown in FIGS. 8A and 8B.

FIG. 8A shows how the storage area of the SRAM 40 is divided into a header area, an asynchronous transmission data area, an asynchronous reception data area, an isochronous transmission data area, and an isochronous reception data area. Similarly, FIG. 8B shows how the storage area of the SDRAM 50 is divided into an isochronous transmission data area and an isochronous reception data area. Note that areas other than those shown in FIGS. 8A and 8B could be provided as the storage areas of the SRAM 40 and SDRAM 50.

In FIG. 8A, ATP1 (BUS1-side asynchronous Tx pointer) is provided as a read pointer for the asynchronous transmission data area and ATP2 (BUS2-side asynchronous Tx pointer) is provided as a write pointer therefor.

Similarly, ARP1 (BUS1-side asynchronous Rx pointer) is provided as a write pointer for the asynchronous reception data area and ARP2 (BUS2-side asynchronous Rx pointer) is provided as a read pointer therefor.

Furthermore, ITP1 (BUS1-side isochronous Tx pointer) is provided as a read pointer for the isochronous transmission data area and ITP2 (BUS2-side isochronous Tx pointer) is provided as a write pointer therefor.

In addition, IRP1 (BUS1-side isochronous Rx pointer) is provided as a write pointer for the isochronous reception data area and IRP2 (BUS2-side isochronous Rx pointer) is provided as a read pointer therefor.

These pointers are managed (set and updated) by the memory pointer management circuit 70 of FIG. 3. The use of these pointers makes it possible to implement efficient reading and writing of data.

Note that AV/C protocol commands are written to the asynchronous transmission data area of FIG. 8A during transmission, or written to the asynchronous reception data area during reception. These AV/C protocol commands are commands for controlling the AV device (reproduction and stop, etc.) and for enquiring about status.

The areas shown in FIGS. 8A and 8B are in a configuration called a ring buffer. In other words, information (data and headers) is stored from one boundary (start address) of each area to the other boundary (end address) thereof, and once that other boundary has been reached, information is stored again from that first boundary.

5. External Connection of SDRAM

With this embodiment, the SRAM 40 (first memory) is provided within the data transfer control device 30 (integrated circuit) and the SDRAM 50 (second memory) is provided outside of the data transfer control device 30 (IC), as shown in FIGS. 9A and 9B. The SDRAM 50 is connected to external terminals of the data transfer control device 30.

The configuration shown in FIGS. 9A and 9B makes it unnecessary to provide the SDRAM 50 within the IC of the data transfer control device 30, thus enabling a reduction in the chip area of the IC. This makes it possible to use an inexpensive general-purpose SDRAM 50, enabling reductions in the cost of the electronic instrument.

However, if the SDRAM 50 is provided on the outside, there is a danger of leaking of the confidentiality of the isochronous data.

With this embodiment of the present invention, the configuration is such that only data that has been encrypted by DES or the like (a second encryption process) is input or output through the external terminals of the data transfer control device 30.

Specifically, during reception, as shown by way of example in FIG. 9A, the DMAC2 reads data from the SRAM 40 (the BUS1 side) and the ENC/DEC2 encrypts the thus-read data by DES (broadly speaking: a second encryption process). The DMAC2 writes the encrypted data to the SDRAM 50 through the external terminals (data terminals) of the data transfer control device 30.

The DMAC3 then reads the encrypted data that has been written to the SDRAM 50 through the external terminals of the data transfer control device 30, and transfers the thus-read encrypted data to the BUS2 side to which the HDD 10 (storage medium) or the like is connected.

During transmission, on the other hand, the DMAC3 reads data that has been encrypt by DES from the HDD 10 through the BUS2, as shown in FIG. 9B. The data is written to the SDRAM 50 through the external terminals of the data transfer control device 30.

The DMAC2 reads the encrypted data that has been written to the SDRAM 50 through the external terminals of the data transfer control device 30, and the ENC/DEC2 uses the DES decryption process to decrypt the thus-read encrypted data. The DMAC2 writes the decrypted data to the SRAM 40 (transfer to the BUS1 side). The DMAC2 writes the decrypted data to the SRAM 40 (transfer to the BUS1 side).

Note that the ENC/DEC1 decrypts the data that has been encrypted by IEEE 1394 DTCP (broadly speaking: a first encryption process) during reception, as shown in FIG. 9A. The DMAC1 writes the decrypted data to the DMAC1.

During the transmission of FIG. 9B, on the other hand, the DMAC1 reads data from the SRAM 40 and the ENC/DEC1 encrypts the thus-read data. The DMAC1 then transfers the encrypted data to the DMAC1.

In the above described manner, only encrypted data is input or output through the external terminals (data terminals) of the data transfer control device 30. This maintains the confidentiality of the data and enables the implementation of copyright protection for the data contents.

Data confidentiality can be further increased by storing only encrypted data in the SDRAM 50.

The provision of the ENC/DEC and ENC/DEC2 as shown in FIGS. 9A and 9B ensures that the SRAM 40 always stores only decrypted data. This makes it possible for the processing section 60 to use the SRAM 40 for packet processing (packet analysis and packet preparation).

Note that encryption might not be necessary, depending on the data contents. For example, if the contents are distributed as analog data, in some cases copyright protection will not be required, so encryption is not necessary.

There is a danger that the execution of encryption/decryption processing by ENC/DEC2 will reduce the transfer speed by an equivalent amount.

With this embodiment, paths are provided for bypassing encryption/decryption processing.

More specifically, during the reception shown in FIG. 9A, the DMAC2 (second memory access control circuit) uses a bypass path 62 to bypass the DES encryption process (second encryption process) for data for which encryption is not necessary. Data that has been read from the SRAM 40 (data on the BUS1 side) is written directly to the SDRAM 50 without passing through the ENC/DEC2, by way of example.

During the transmission shown in FIG. 9B, on the other hand, the DMAC2 uses the bypass path 62 to bypass the DES decryption process (second decryption process) when decryption is not necessary. Data read from the SDRAM 50 is written directly to the SRAM 40 without passing through the ENC/DEC2 (transfer to the BUS1 side).

This makes it possible to do without unnecessary encryption and decryption processing for data (contents) that do not require copyright protection. As a result, the effective transfer rate of the data transfer can be increased.

Note that a configuration in which the SRAM 40 (internal memory) is not provided could be used when encrypted data is input or output with respect to the SDRAM 50 (external memory) through the external terminals of the data transfer control device 30, as shown in FIGS. 10A and 10B.

For example, during reception as shown in FIG. 10A, the ENC/DEC2 included within the DMAC2 encrypts data transferred from the BUS1 side (the 1394 interface 31) by DES (second encryption process). The DMAC2 writes the thus-encrypted data to the SDRAM 50. The DMAC3 reads the encrypted data from the SDRAM 50 and transfers it to the BUS2 side (the IDE interface 34).

During transmission as shown in FIG. 10B, the DMAC3 writes encrypted data transferred from the BUS2 side (the IDE interface 34) to the SDRAM 50. The DMAC2 reads the encrypted data from the SDRAM 50 and the ENC/DEC2 decrypts the thus-read data. The DMAC2 transfers the decrypted data to the BUS1 side (the 1394 interface 31).

Note that DTCP encryption/decryption processing could be done by the ENC/DEC2 or by the 1394 interface 31.

6. Detailed Configurational Example

Figure 11:
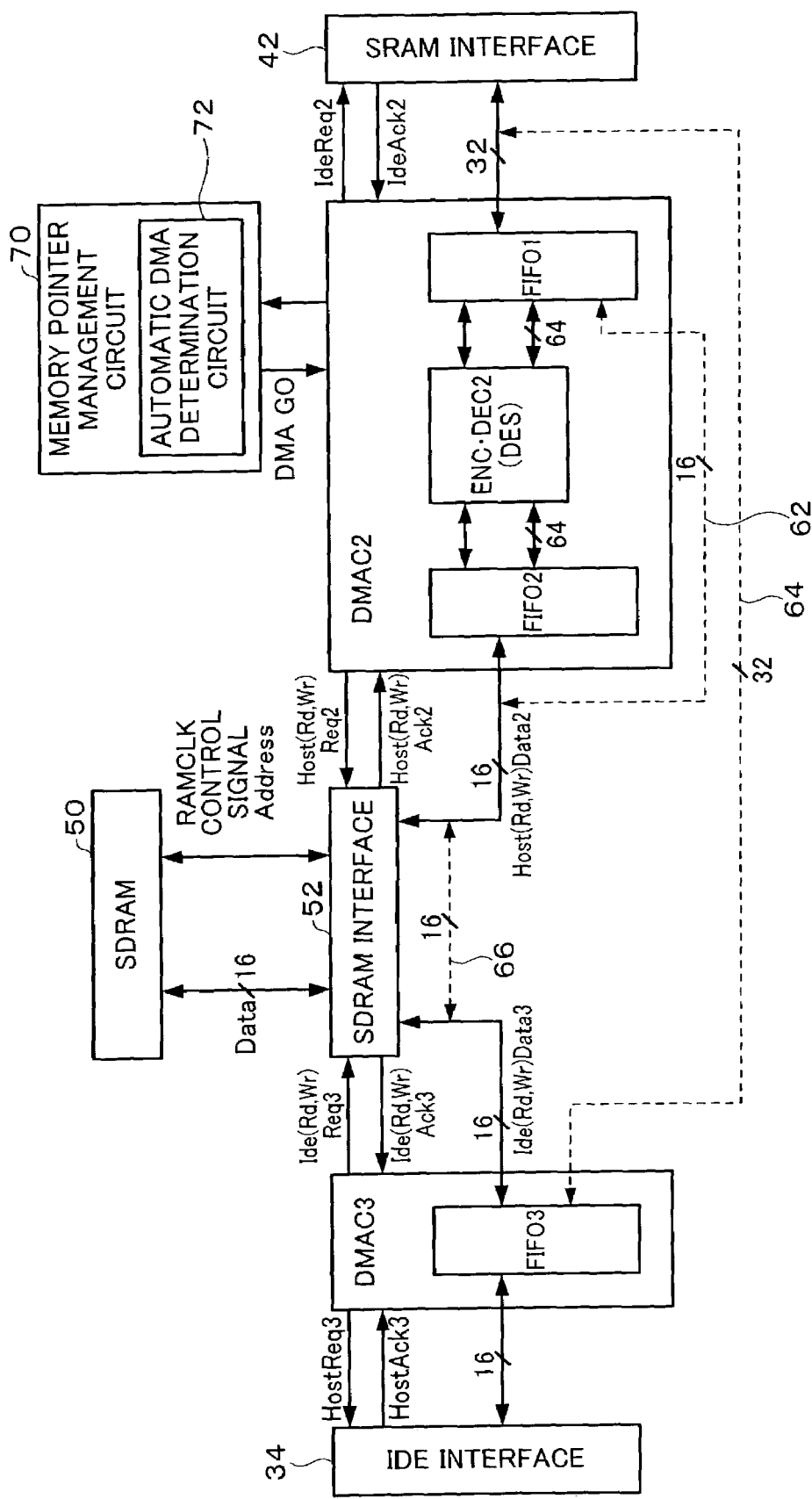
FIG. 11 shows a detailed configurational example of the data transfer control device.

An example of details of the configuration and connections of the DMAC2, the SDRAM interface 52, and the DMAC3 is shown in FIGS. 11 and 12.

The meanings of the various signals used in FIGS. 11 and 12 are shown in FIGS. 13A, 13B, and 13C. Note that IdeReq2 in FIG. 11 is an access (read or write) signal from the DMAC2 to the SRAM 40 and IdeAck2 is an access acknowledgement signal. Similarly, HostReq3 is an access request signal from the DMAC3 to the IDE side and HostAck3 is an access acknowledgement signal. DMAGO is an automatic DMA start signal.

As shown in FIG. 11, the DMAC2 includes a FIFO1, the ENC/DEC2, and a FIFO2. During reception, data that has been read from the SRAM 40 through the SRAM interface 42 accumulates temporarily in the FIFO1. The FIFO1 outputs that data to the ENC/DEC2. The ENC/DEC2 encrypts the data and the encrypted data accumulates in the FIFO2. The FIFO2 sends the accumulated data to the SDRAM 50.

During transmission, on the other hand, data that has been read from the SDRAM 50 through the SDRAM interface 52 is accumulates temporarily in the FIFO2. The FIFO2 outputs that data to the ENC/DEC2. The ENC/DEC2 decrypts the data and the decrypted data accumulates in the FIFO1. The FIFO1 sends the accumulated data to the SRAM 40.

Note that if encryption is not performed on the data, the data read from the SRAM 40 is sent directly to the SDRAM 50 through the bypass path 62. Similarly, if decryption is not performed on the data, the data read from the SDRAM 50 is sent directly to the SRAM 40 through the bypass path 62.

The DMAC2 starts DMA when the automatic DMA start signal from the memory pointer management circuit 70 (the automatic DMA determination circuit 72) becomes active.

The DMAC3 includes a FIFO3, as shown in FIG. 11. During reception, the data read from the SDRAM 50 accumulates temporarily in the FIFO3 before being sent to the IDE side. During transmission, on the other hand, the data from the IDE side accumulates temporarily in the FIFO3 before being sent to the SDRAM 50.

Note that a bypass path 64 is a bypass path for when the ENC/DEC2 and SDRAM 50 are not used. If the encryption process of the SDRAM 50 is not necessary, this bypass path 64 is selected for the data transfer. A bypass path 66 is a bypass path for when the SDRAM 50 is not used. If the SDRAM 50 is not required (during asynchronous data transfer, for example) this bypass path 66 is selected for the data transfer.

The data transfer control device 30 and the SDRAM 50 use a synchronization clock signal RAMCLK, control signals CKE, XCS, XRAS, XCAS, XWE, UDQM, and LDQM, and an address signal Address to transfer data Data, as shown in FIG. 12. Note that the meanings of these signals are shown in FIG. 13A.

Specifically, the data transfer control device 30 uses the control signals (on the memory bus) to set various operating modes (commands) in the SDRAM 50 and start addresses. When that happens, the SDRAM 50 inputs or outputs data (burst data) sequentially from the start address, in synchronization with RAMCLK. In other words, the SDRAM 50 generates addresses automatically within itself, and accesses internal memory blocks based on the thus-generated addresses. Note that in this case the RAMCLK could also be a high-speed clock signal that is generated internally, for accessing internal memory blocks.

Figure 14A:
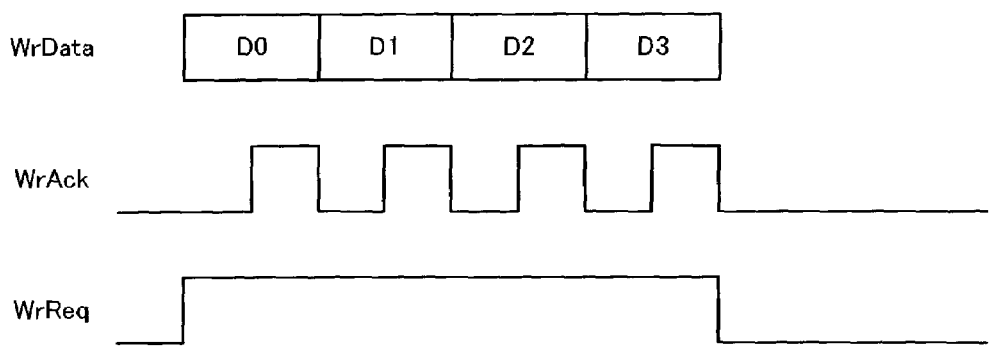
FIGS. 14A and 14B show the timing waveforms of the signals.
Figure 14B:
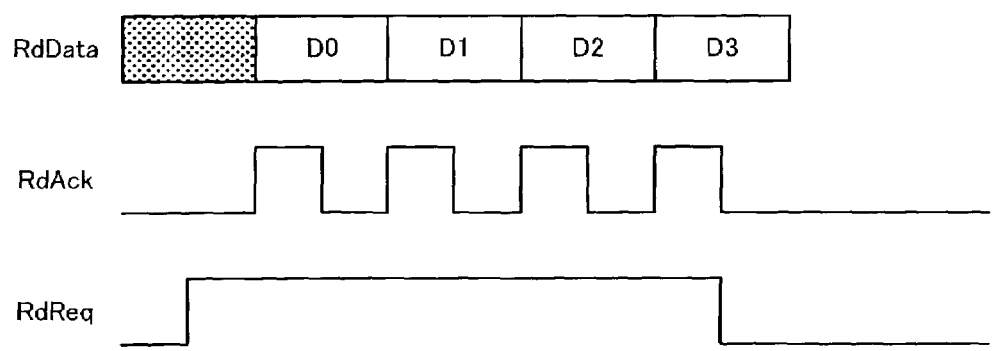

Timing waveforms in FIGS. 14A and 14B are examples of the write data WrData, write acknowledgement signal WrAck, write request signal WrReq, read data RdData, read acknowledgement signal RdAck, and read request signal RdReq of FIGS. 13B and 13C.

7. Operation of Data Transfer Control Device

Figure 15:
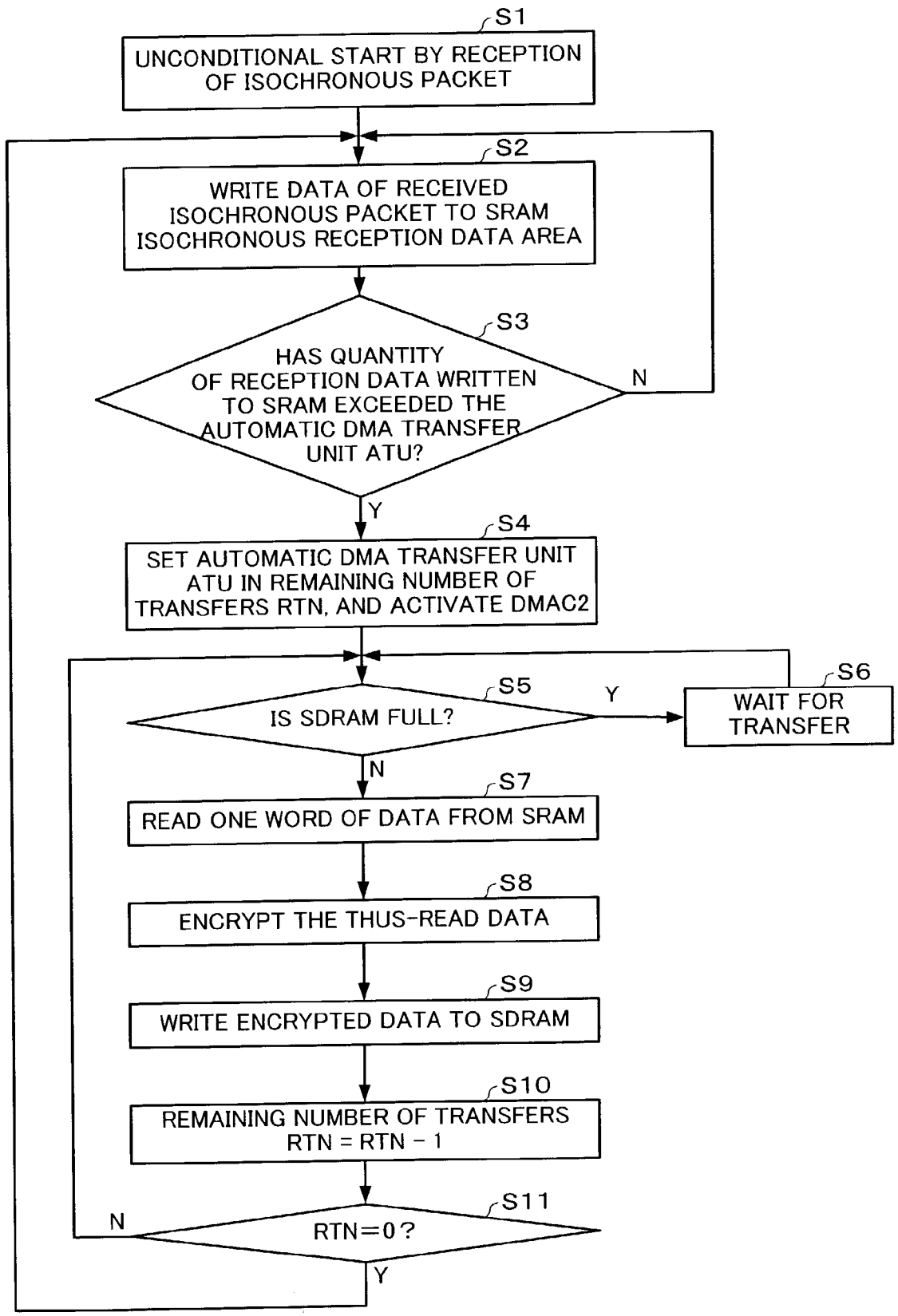
FIG. 15 is a flowchart illustrative of the operation of this embodiment.
Figure 16:
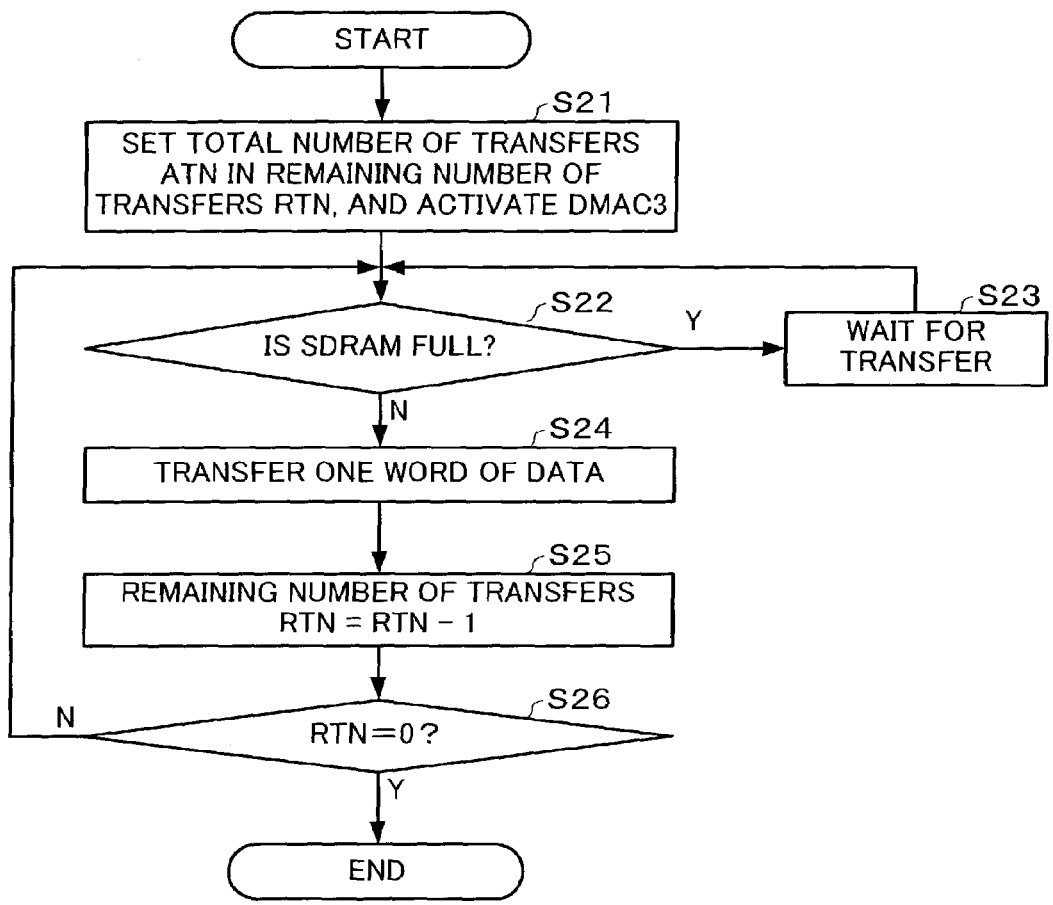
FIG. 16 is another flowchart illustrative of the operation of this embodiment.
Figure 17:
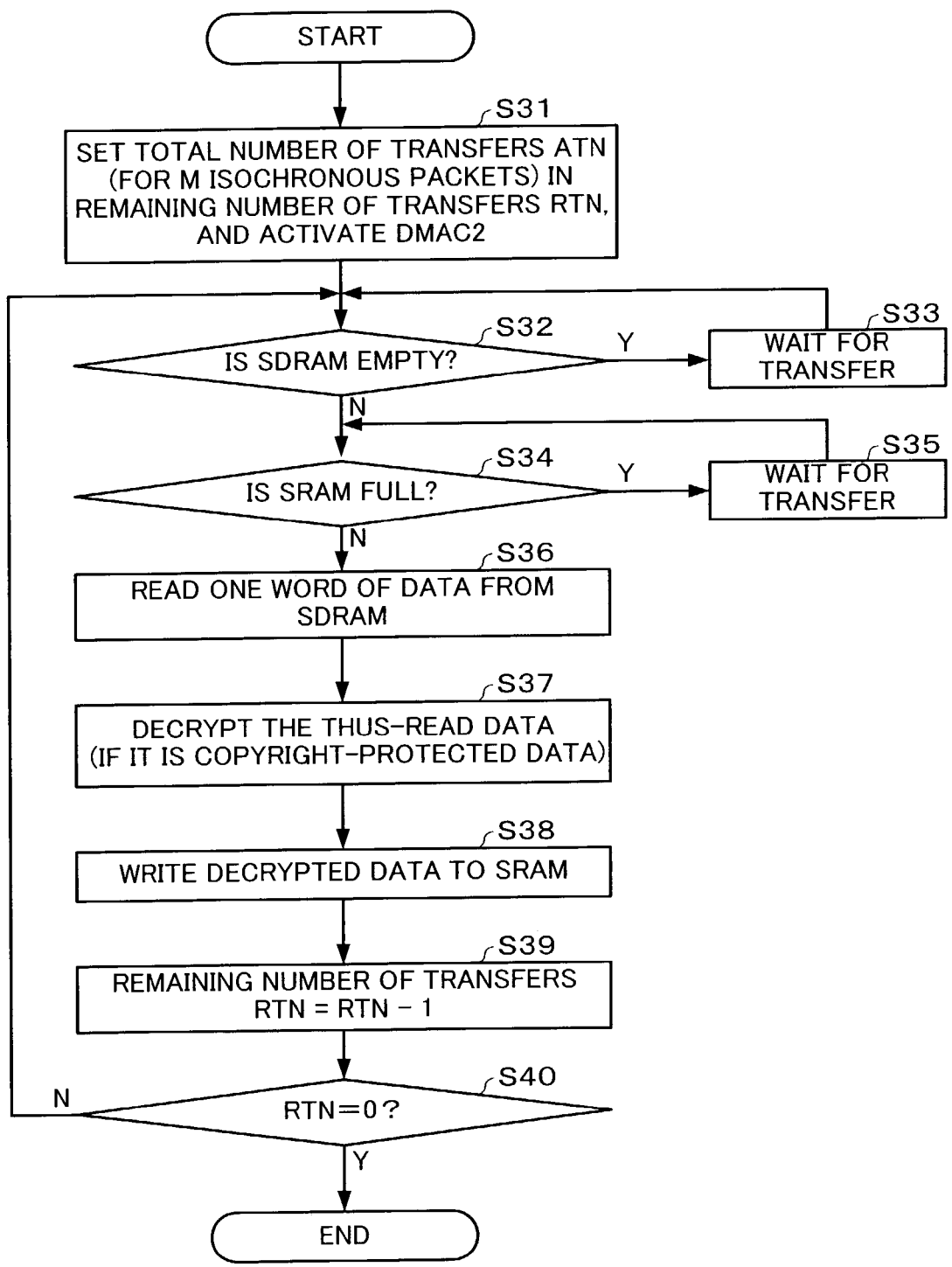
FIG. 17 is a further flowchart illustrative of the operation of this embodiment.

The description now turns to the operation of the data transfer control device of this embodiment, with reference to the flowcharts of FIGS. 15, 16, and 17.

FIG. 15 is a flowchart of the operation during reception.

First of all, the transfer processing starts unconditionally at the reception of an isochronous packet (step S1). The data of the received isochronous packet is written to the isochronous reception data area of the SRAM (step S2).

The system then determines whether or not the quantity of reception data that has been written to SRAM exceed an automatic DMA transfer unit ATU (step S3). If it does exceed it, the automatic DMA transfer unit ATU is set in the number of remaining transfers RTN and the DMAC2 is activated (step S4). More specifically, the automatic DMA start signal DMAGO of FIG. 11 goes active.

The system then determines whether or not the SDRAM storage area is full (step S5). If it is full, the transfer waits (step S6) until there is space in the SDRAM.

If it is not full (if there is space therein), on the other hand, one word of data is read from the SRAM (step S7). The thus-read data is encrypted and written to the SDRAM (steps S8 and S9).

The number of remaining transfers RTN is decremented by one (step S10). The system then determines whether or not RTN is zero (step S11) and the flow returns to step S5 if RTN is not zero or to step S2 if RTN is zero.

The above described procedure ensures that data that has been received over BUS1 (IEEE 1394) is written to the SDRAM through the SRAM.

FIGS. 16 and 17 are flowcharts of the operation during transmission.

First of all, the total number of transfers ATN is set in the number of remaining transfers RTN and the DMAC3 is activated (step S21).

The system then determines whether or not the SDRAM storage area is full (step S22) and, if it is full, the transfer waits (step S23) until there is space. If it is not full (if there is space therein), one word of data is transferred (step S24).

The number of remaining transfers RTN is then decremented by one (step S25). The system then determines whether or not RTN is zero (step S26) and, if RTN is not zero, the flow returns to step S22 and processing ends when RTN does reach zero.

The above described procedure ensures that data from the BUS2 (IDE) side is written to SDRAM.

The total number of transfers ATN (for M isochronous packets) is then set in the number of remaining transfers RTN and the DMAC2 is activated (step S31), as shown in FIG. 17.

The system then determines whether or not the SDRAM storage area is empty (step S32) and, if it is empty, the transfer waits (step S33) until data has filled the SDRAM. If the SDRAM is not empty (if it is full of data), on the other hand, the system determines whether or not the SRAM storage area is full (step S34). If it is full, the transfer waits (step S35), until the there is space in the SRAM.

If the SRAM storage area is not full (if there is space therein), one word of data is read from the SDRAM (step S36) If it is copyright-protected data, the thus-read data is decrypted (step S37), and the decrypted data is written to the SRAM (step S38).

The number of remaining transfers RTN is then decremented by one (step S39). The system then determines whether or not RTN is zero (step S40) and, if RTN is not zero, the flow returns to step S32 and processing ends when RTN does reach zero.

In the above-described manner, data that has been written to SDRAM is written to SRAM.

8. Application to USB

Figure 18:
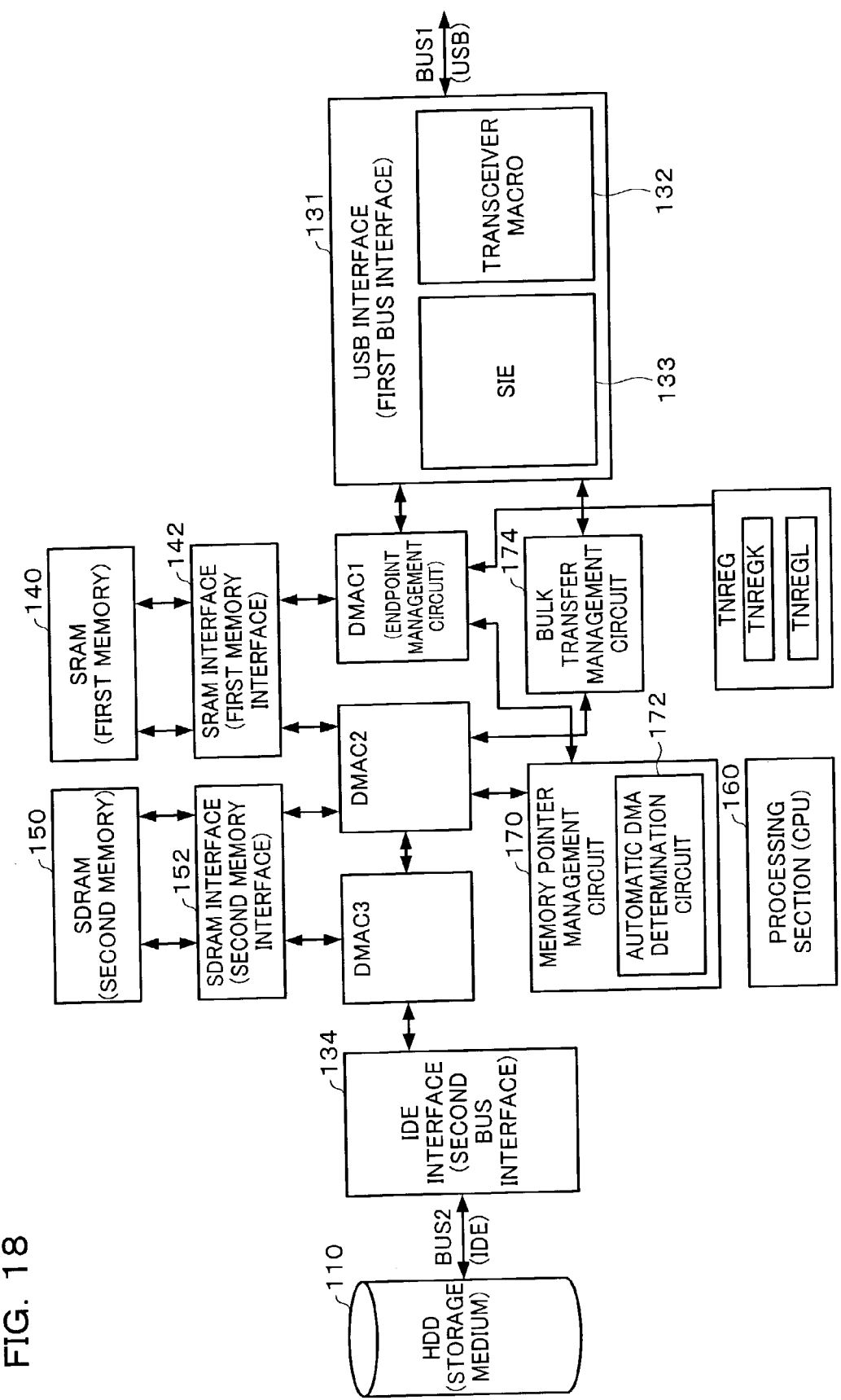
FIG. 18 shows an example of the configuration of the data transfer control device when the method of this embodiment is applied to USB.

An example of the configuration of the data transfer control device that is shown in FIG. 18 concerns the application of the method of this embodiment to USB (such as USB 2.0).

The configuration of FIG. 18 differs from that of FIG. 3 in the points described below.

That is to say, FIG. 18 is provided with a USB interface 131 instead of the 1394 interface 31 of FIG. 3. In addition, the DMAC1 also has the function of an end point management circuit in FIG. 18. Furthermore, a bulk transfer management circuit 174 is provided in FIG. 18. In all other points, this configuration is substantially the same as that of FIG. 3.

In FIG. 18, a transceiver macro 132 included by the USB interface 131 is a circuit for implementing data transfer in USB FS mode or HS mode. A transceiver macrocell that conforms to the USB 2.0 Transceiver Macrocell Interface (UTMI), which defines physical-layer circuitry and some logical-layer circuitry for USB 2.0, could be used as the transceiver macro 132. This transceiver macro 132 includes an analog front-end circuit for transmitting data over USB by using a difference signal, and it could also include circuitry for processing such as bit stuffing, bit unstuffing, serial-to-parallel conversion, parallel-to-serial conversion, NRZI decoding, NRZI encoding, and sampling clock generation.

A serial interface engine (SIE) included by the USB interface 131 is circuitry for performing various processes such as USB packet transfer processing. This SIE can include circuitry for managing transactions, circuitry for assembling (creating) and disassembling packets, and circuitry for creating or reading CRCs.

Circuits such as the DMAC1, DMAC2, and DMAC3 of FIG. 18 implement processing that is similar to that of the circuits described with reference to FIG. 3, etc.

Note that the DMAC1 also has the function of managing the end points that form entrances to the storage areas of an SDRAM 140. Specifically, the DMAC1 including a register for storing end point attribute information.

The bulk transfer management circuit 174 is a circuit for managing bulk transfers by USB.

Note that the present invention is not limited to the embodiments described above, and thus various modifications thereto are possible within the scope of the present invention laid out herein.

For example, terminology (such as: SRAM, SDRAM, SRAM interface, SDRAM interface, IEEE 1394 or USB bus, IDE bus, 1394 interface, IDE interface, DMAC1, DMAC2, DMAC3, HDD, DTCP, and DES) that is derived from generic terminology defined within this document (such as: first memory, second memory, first memory interface, second memory interface, first bus, second bus, first bus interface, second bus interface, first memory access control circuit, second memory access control circuit, third memory access control circuit, storage medium, first encryption/decryption processing, and second encryption/decryption processing) could be replaced by other terminology used within this document.

It is possible for an aspect of the present invention that is defined by a dependent claim to omit some of the configurational requirements of the corresponding antecedent claim. Similarly, the components of the present invention defined by an independent claim can also be allocated to other independent claims.

The configuration of the data transfer control device of the present invention is not limited to those shown in FIGS. 3, 9A to 12, and 18, and thus various modifications thereto are possible. For example, some of the various blocks and units in these figures can be omitted, and the connective relationships therebetween can be modified.

The present invention can also be applied to data transfer in accordance with bus standards that are based on a similar concept to that of IEEE 1394 or USB, or standards that are developed from IEEE 1394 or USB. Alternatively, the present invention can be applied to transfer over a bus (high-speed serial bus) conforming to a standard other than IEEE 1394 or USB.

What is claimed is:

1. A data transfer control device for data transfer through a bus, the data transfer control device comprising:
   a first memory access control circuit which writes packets transferred from a first bus side, to a first memory;
   a second memory access control circuit which reads isochronous data included within an isochronous packet among the packets written to the first memory, and writes the read isochronous data to a second memory; and
   a third memory access control circuit which reads the isochronous data that has been written to the second memory, and transfers the read isochronous data to a second bus side.

2. The data transfer control device as defined by claim 1, wherein a storage area of the first memory includes an isochronous data area in which isochronous data is stored and another area,
   wherein the first memory access control circuit writes isochronous data included within an isochronous packet among packets transferred from the first bus side, to the isochronous data area in the first memory, and
   wherein the second memory access control circuit reads the isochronous data that has been written to the isochronous data area of the first memory and writes the read isochronous data to the second memory.

3. The data transfer control device as defined by claim 1, wherein a storage area of the first memory includes an isochronous data area in which isochronous data is stored and an asynchronous data area in which asynchronous data is stored, and
   wherein the first memory access control circuit writes isochronous data included within an isochronous packet among packets transferred from the first bus side, to an isochronous data area in the first memory, and writes asynchronous data included within an asynchronous packet among packets transferred to the first bus side, to the asynchronous data area in the first memory.

4. The data transfer control device as defined by claim 1, wherein a storage area of the first memory includes an isochronous reception data area which stores isochronous data transferred from the first bus side and an isochronous transmission data area which stores isochronous data transferred from the second bus side,
   wherein a storage area of the second memory includes an isochronous reception data area which stores isochronous data transferred from the first bus side and an isochronous transmission data area which stores isochronous data transferred from the second bus side,
   wherein the first memory access control circuit writes isochronous data that is transferred from the first bus side to the isochronous reception data area of the first memory, and wherein the second memory access control circuit reads isochronous data that has been written to the isochronous reception data area of the first memory and writes the read isochronous data to the isochronous reception data area of the second memory.

5. A data transfer control device for data transfer through a bus, the data transfer control device comprising:
a third memory access control circuit which writes isochronous data transferred from a second bus side, to a second memory;
a second memory access control circuit which reads the isochronous data that has been written to the second memory and writes the read isochronous data to the first memory; and
a first memory access control circuit which reads the isochronous data that has been written to the first memory and transfers an isochronous packet including the read isochronous data to a first bus side.

6. The data transfer control device as defined by claim 5, wherein a storage area of the first memory includes an isochronous data area in which isochronous data is stored and another area,
wherein the second memory access control circuit reads the isochronous data that has been written to the second memory and writes the read isochronous data to the isochronous data area of the first memory, and
wherein the first memory access control circuit reads the isochronous data that has been written to the isochronous data area of the first memory and transfers an isochronous packet including the read isochronous data to the first bus side.

7. The data transfer control device as defined by claim 5, wherein a storage area of the first memory includes an isochronous data area in which isochronous data is stored and an asynchronous data area in which asynchronous data is stored, and
wherein the first memory access control circuit reads isochronous data that has been written to the isochronous data area of the first memory, transfers an isochronous packet including the read isochronous data to the first bus side, reads asynchronous data that has been written to an asynchronous data area of the first memory, and transfers an asynchronous packet including the read asynchronous data to the first bus side.

8. The data transfer control device as defined by claim 5, wherein a storage area of the first memory includes an isochronous reception data area which stores isochronous data transferred from the first bus side and an isochronous transmission data area which stores isochronous data transferred from the second bus side,
wherein a storage area of the second memory includes an isochronous reception data area which stores isochronous data transferred from the first bus side and an isochronous transmission data area which stores isochronous data transferred from the second bus side,
wherein the second memory access control circuit reads isochronous data that has been written to the isochronous transmission data area of the second memory and writes the read isochronous data to the isochronous transmission data area of the first memory, and
wherein the first memory access control circuit reads isochronous data that has been written to the isochronous transmission data area of the first memory and transfers an isochronous packet including the read isochronous data to the first bus side.

9. The data transfer control device as defined by claim 1, wherein the second memory is a synchronized type of memory that is capable of inputting and outputting data having sequential addresses in synchronization with a clock.

10. The data transfer control device as defined by claim 5, wherein the second memory is a synchronized type of memory that is capable of inputting and outputting data having sequential addresses in synchronization with a clock.

11. The data transfer control device as defined by claim 1, wherein the first memory is an internal memory provided within the data transfer control device, and the second memory is an external memory provided outside the data transfer control device.

12. The data transfer control device as defined by claim 5, wherein the first memory is an internal memory provided within the data transfer control device, and the second memory is an external memory provided outside the data transfer control device.

13. The data transfer control device as defined by claim 9, wherein the first memory is an internal memory provided within the data transfer control device, and the second memory is an external memory provided outside the data transfer control device.

14. The data transfer control device as defined by claim 10,
wherein the first memory is an internal memory provided within the data transfer control device, and the second memory is an external memory provided outside the data transfer control device.

15. An electronic instrument comprising:
the data transfer control device defined by claim 1;
the second bus connected with the data transfer control device; and
a storage medium storing data transferred from the data transfer control device through the second bus.

16. An electronic instrument comprising:
the data transfer control device defined by claim 5;
the second bus connected with the data transfer control device; and
a storage medium storing data transferred from the data transfer control device through the second bus.

17. An electronic instrument comprising:
the data transfer control device defined by claim 9;
the second bus connected with the data transfer control device; and
a storage medium storing data transferred from the data transfer control device through the second bus.

18. An electronic instrument comprising:
the data transfer control device defined by claim 10;
the second bus connected with the data transfer control device; and
a storage medium storing data transferred from the data transfer control device through the second bus.

19. A data transfer control method for data transfer through a bus, the method comprising:
writing packets transferred from a first bus side, to a first memory;
reading isochronous data included within an isochronous packet among the packets written to the first-memory, and writing the read isochronous data to a second memory; and
reading the isochronous data that has been written to the second memory, and transferring the read isochronous data to a second bus side.

20. A data transfer control method for data transfer through a bus, the method comprising:
   writing isochronous data transferred from a second bus side, to a second memory;
   reading the isochronous data that has been written to the second memory and writing the read isochronous data to the first memory; and
   reading the isochronous data that has been written to the first memory and transferring an isochronous packet including the read isochronous data to a first bus side.

* * * * *